(12) United States Patent
Saitoh et al.

(10) Patent No.: US 9,268,437 B2
(45) Date of Patent: Feb. 23, 2016

(54) DISPLAY DEVICE, METHOD FOR DRIVING DISPLAY DEVICE, AND ELECTRONIC EQUIPMENT

(71) Applicant: Sharp Kabushiki Kaisha, Osaka-shi, Osaka (JP)

(72) Inventors: Kohji Saitoh, Osaka (JP); Akizumi Fujioka, Osaka (JP); Masami Ozaki, Osaka (JP); Toshihiro Yanagi, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 14/492,287

(22) Filed: Sep. 22, 2014

(65) Prior Publication Data

US 2015/0009166 A1  Jan. 8, 2015

Related U.S. Application Data

(63) Continuation of application No. 13/984,338, filed as application No. PCT/JP2012/059602 on Apr. 6, 2012, now Pat. No. 8,872,783.

(30) Foreign Application Priority Data

Apr. 15, 2011  (JP) .................................. 2011-091541

(51) Int. Cl.
*G06F 3/041* (2006.01)
*G06F 3/044* (2006.01)
*G09G 3/36* (2006.01)

(52) U.S. Cl.
CPC .............. *G06F 3/0416* (2013.01); *G06F 3/041* (2013.01); *G06F 3/044* (2013.01); *G06F 3/0412* (2013.01);

(Continued)

(58) Field of Classification Search
CPC ..... G06F 3/0416; G06F 3/041; G06F 3/0412; G06F 3/044; G09G 3/3614; G09G 2310/06; G09G 2310/08; G09G 2330/06; G09G 2340/0435

See application file for complete search history.

(56) References Cited

U.S. PATENT DOCUMENTS

2005/0264535 A1  12/2005 Johnson et al.
2006/0201931 A1* 9/2006 Lee ..................... G02F 1/13338
                                              219/497

(Continued)

FOREIGN PATENT DOCUMENTS

EP        2221659 A1 *  8/2010  ............ G06F 1/3203
WO   2004/023376 A2    3/2004

OTHER PUBLICATIONS

Official Communication issued in corresponding European Patent Application No. 12771937.5, mailed on Dec. 16, 2014.

(Continued)

*Primary Examiner* — Premal Patel
(74) *Attorney, Agent, or Firm* — Keating & Bennett, LLP

(57) ABSTRACT

A display device; a method for driving the display device; and electronic equipment, each enabling a detection device to perform detection with a frequency higher than a refresh frequency of the display device and with improved accuracy are provided. The display device has a screen including pixels and repeatedly alternates between a scanning frame during which the pixels are scanned to be sequentially brought into a selected state and a pause frame during which the pixels are not scanned, and includes a detection instructing circuit configured to output detection operation control signals corresponding to touch panel detection periods to the detection device in at least one pause frame. The detection instruction signal instructs the detection device to detect at least one of detection targets which are input by touching or approaching the screen and a radio wave coming from outside the display device.

4 Claims, 18 Drawing Sheets

(52) U.S. Cl.
CPC .......... *G09G 3/3614* (2013.01); *G09G 2310/06* (2013.01); *G09G 2310/08* (2013.01); *G09G 2330/06* (2013.01); *G09G 2340/0435* (2013.01)

(56) References Cited

U.S. PATENT DOCUMENTS

2011/0001714 A1* 1/2011 Sasaki ..................... G02F 1/173
                                                        345/173
2011/0141151 A1* 6/2011 Fujioka ................. G06F 1/3203
                                                        345/690

OTHER PUBLICATIONS

Saitoh et al., "Display Device, Method For Driving Display Device, and Electronic Equipment". U.S. Appl. No. 13/984,338, filed Aug. 8, 2013.

* cited by examiner

TP detection operation
control signal

DISPLAY DEVICE, METHOD FOR DRIVING DISPLAY DEVICE, AND ELECTRONIC EQUIPMENT

TECHNICAL FIELD

The present invention relates to a display device capable of directly or indirectly controlling a detection (reception) device having, for example, a touch panel, a method for driving the display device, and electronic equipment including the display device and the detection device.

BACKGROUND ART

Commercially available display devices include: a mobile terminal-use display capable of directly or indirectly controlling a detection (reception) device having a touch panel function; and a mobile terminal equipped with such a mobile terminal-use display.

The detection device includes a detection section for detecting a touch of a human finger or stylus. A human finger or stylus traces the detection section (touches the detection section). Consequently, a user's operation of a mobile terminal, corresponding to the tracing movement (touching movement), is detected by the detection section.

The above-mentioned mobile terminal-use display (display device) equipped with a touch panel generates noises when it carries out scanning. The noises influence the touch panel (capacitive touch panel in particular), thus deteriorating detection accuracy of the touch panel (detection device).

In order to deal with this, as shown in a first conventional art example in FIG. 16, there has been conventionally performed a control to synchronize a non-scanning period (blanking period) during which a moving image is not displayed on the display device with a detection period (touch panel detection period) of the detection device. Synchronization of the non-scanning period and the detection period allows greatly improving detection accuracy.

The control performed in the first conventional art example in FIG. 16 suffers a problem below. Since the non-scanning period (blanking period) is normally on the order of 100 μsec, the detection period synchronized with the non-scanning period is also on the order of 100 μsec. Normally, the detection period requires approximately 10 msec. Accordingly, the control performed in the first conventional art example does not allow the detection device to make detection.

In order to deal with the problem of the first conventional art example in FIG. 16, a control performed in a second conventional art example in FIG. 17 has been proposed. As shown in FIG. 17, the second conventional art example makes a scanning period as short as possible, thereby making a non-scanning period as long as possible (e.g. 0.5 msec or more). The non-scanning period is synchronized with the detection period, similarly with the first conventional art example.

In the control performed in the second conventional art example, the non-scanning period is synchronized with the detection period, similarly with the first conventional art example. Therefore, the control performed in the second conventional art example can greatly improve accuracy in detection, similarly with the first conventional art example.

In addition, in the control performed in the second conventional art example, the non-scanning period is made longer, so that the detection period is made longer, too. This allows securing a detection period required for detecting user's operation.

The control performed in the second conventional art example in FIG. 17 suffers a problem below. In the control performed in the second conventional art example, one frame period includes one scanning period and one non-scanning period, similarly with the control performed in the first conventional art example. The non-scanning period is synchronized with the detection period.

Therefore, the number of the scanning periods is equal to the number of the non-scanning periods (i.e. the number of times detection is made). Accordingly, a detection frequency offered by a touch panel which serves as a detection device is equal to a refresh frequency of a display device.

In the control performed in the second conventional art example in FIG. 17, since one frame period is 16.6 msec, a refresh frequency of the display device is 60 Hz. In this case, a detection frequency offered by the touch panel which serves as the detection device is also 60 Hz. Therefore, the control performed in the second conventional art example cannot deal with handwriting which requires a detection frequency of 100 Hz or more.

In relation to the second conventional art example in which the non-scanning period is made as long as possible, Patent Literature 1 discloses a method for driving a display device that provides a non-scanning period which is longer than a scanning period during which scanning is carried out once over the screen. This driving method provides a pause period during which all scanning signal lines are brought into a non-scanning state, thereby realizing low power consumption.

CITATION LIST

Patent Literature

[Patent Literature 1]
Japanese Patent Application Publication No. 2001-312253 (published on Nov. 9, 2001)

SUMMARY OF INVENTION

Technical Problem

In the first and second conventional art examples, one frame period includes a scanning period and a non-scanning period. With reference to FIG. 18, the following description will discuss a third conventional art example which is an application of the second conventional art example.

In the control performed in the third conventional art example in FIG. 18, a display panel of a display device can be brought into a first state or a second state. A frame corresponding to the first state is a frame in which all pixels provided in the display panel are scanned, i.e. a scanning frame.

On the other hand, a frame corresponding to the second state, which frame follows the frame corresponding to the first state, is a frame in which no pixels are scanned, i.e. a pause frame.

Alternation between the scanning frame and the pause frame is repeated.

In a case where the scanning frame and the pause frame are repeated alternately, a detection device detects a user's operation in the pause frame.

Therefore, by putting the detection period of the detection device in the pause frame, it is possible to greatly improve accuracy in detection, similarly with the first and second conventional art examples.

Furthermore, the third conventional art example allocates one frame to a detection period during which a user's operation is detected, thus securing a longer detection period than the second conventional art example.

However, the third conventional art example suffers the same problem as that caused by the second conventional art example. Specifically, a refresh frequency of the display device in the third conventional art example is represented by:

$$1/(2 \times Tf) \qquad (1)$$

wherein Tf represents one frame period.

This is because in two frame periods (2×Tf) being a sum of one scanning frame and one pause frame, refresh of the display device is performed once while detection made by a touch panel serving as a detection device is performed once.

Consequently, a detection frequency offered by the touch panel serving as the detection device is equal to a refresh frequency of the display device. Accordingly, when a refresh frequency of the display device corresponding to two frame periods of (2×Tf) is 60 Hz, a detection frequency is 60 Hz, too, so that the third conventional art example cannot deal with handwriting which requires a detection frequency of 100 Hz or more.

Furthermore, even if such a detection device is provided in the invention of Patent Literature 1 in which a non-scanning period is set to be longer than a scanning period, a refresh frequency and a detection frequency are equal to each other, similarly with the second and third conventional art examples.

The present invention was made in view of the foregoing problem. An object of the present invention is to provide a display device, a method for driving the display device, and electronic equipment, each of which enables a detection device to make a detection operation with a frequency higher than a refresh frequency of the display device and with improved detection accuracy.

Solution to Problem

In order to solve the foregoing problem, a display device of the present invention is a display device having a screen including a plurality of pixels, the display device repeatedly alternating between (a) each of scanning periods during which the plurality of pixels are scanned in such a manner that the plurality of pixels are sequentially brought into a selected state and (b) each of non-scanning periods during which the plurality of pixels are not scanned at all, the display device comprising: detection instructing circuit configured to output a detection operation control signal to a detection device plural times in at least one of the non-scanning periods, the detection operation control signal being a signal for instructing the detection device to make detections of at least one of detection targets which are (i) an input made by a touch of the screen or an approach to the screen and (ii) a radio wave coming from outside the display device.

In order to solve the foregoing problem, a method of the present invention for driving a display device is a method for driving a display device having a screen including a plurality of pixels, the display device repeatedly alternating between (a) each of scanning periods during which the plurality of pixels are scanned in such a manner that the plurality of pixels are sequentially brought into a selected state and (b) each of non-scanning periods during which the plurality of pixels are not scanned at all, the method comprising the step of: outputting a detection operation control signal to a detection device plural times in at least one of the non-scanning periods, the detection operation control signal being a signal for instructing the detection device to make detections of at least one of detection targets which are (i) an input made by a touch of the screen or an approach to the screen and (ii) a radio wave coming from outside the display device.

With the display device, the detection instructing circuit outputs, plural times in at least one of the non-scanning periods, a detection operation control signal for instructing the detection device to make the detection. Furthermore, the method of the present invention for driving a display device includes the step of outputting a detection operation control signal to a detection device plural times in at least one of the non-scanning periods, the detection operation control signal being a signal for instructing the detection device to make detections. This allows setting detection frequency indicative of how many times the detection is made to be higher than refresh frequency indicative of how many times the plurality of pixels are updated.

For example, assume that detection is made twice in each of all the non-scanning periods in the above display device. In this case, refresh is made once in a period which is a sum of one scanning period and one non-scanning period. On the other hand, the detection is made twice in the period which is a sum of one scanning period and one non-scanning period. Therefore, the detection frequency is a double of the refresh frequency.

Accordingly, when the refresh frequency is, for example, 60 Hz, the detection frequency can be set to 120 Hz. Therefore, it is possible to deal with handwriting which requires a detection frequency of 100 Hz or more.

Furthermore, all the detections are made in the non-scanning periods. This allows eliminating the influence of noises caused by scanning of the display device during the scanning period. This allows greatly improving detection accuracy.

Therefore, it is possible to provide a display device, a method for driving the display device, and electronic equipment, each of which enables a detection device to make a detection operation with a frequency higher than a refresh frequency of the display device and with improved detection accuracy.

Advantageous Effects of Invention

As described above, the display device of the present invention includes detection instructing circuit detection instructing circuit configured to output a detection operation control signal to a detection device plural times in at least one of the non-scanning periods, the detection operation control signal being a signal for instructing the detection device to make detections of at least one of detection targets which are (i) an input made by a touch of the screen or an approach to the screen and (ii) a radio wave coming from outside the display device.

As described above, the method of the present invention includes the step of: outputting a detection operation control signal to a detection device plural times in at least one of the non-scanning periods, the detection operation control signal being a signal for instructing the detection device to make detections of at least one of detection targets which are (i) an input made by a touch of the screen or an approach to the screen and (ii) a radio wave coming from outside the display device.

This yields an effect of enabling a detection device to make a detection operation with a frequency higher than a refresh frequency of the display device and with improved detection accuracy.

DESCRIPTION OF EMBODIMENTS

The following description will discuss an embodiment of the present invention with reference to FIGS. 1 to 10.

(Configuration of Electronic Equipment 1)

Figure 8:
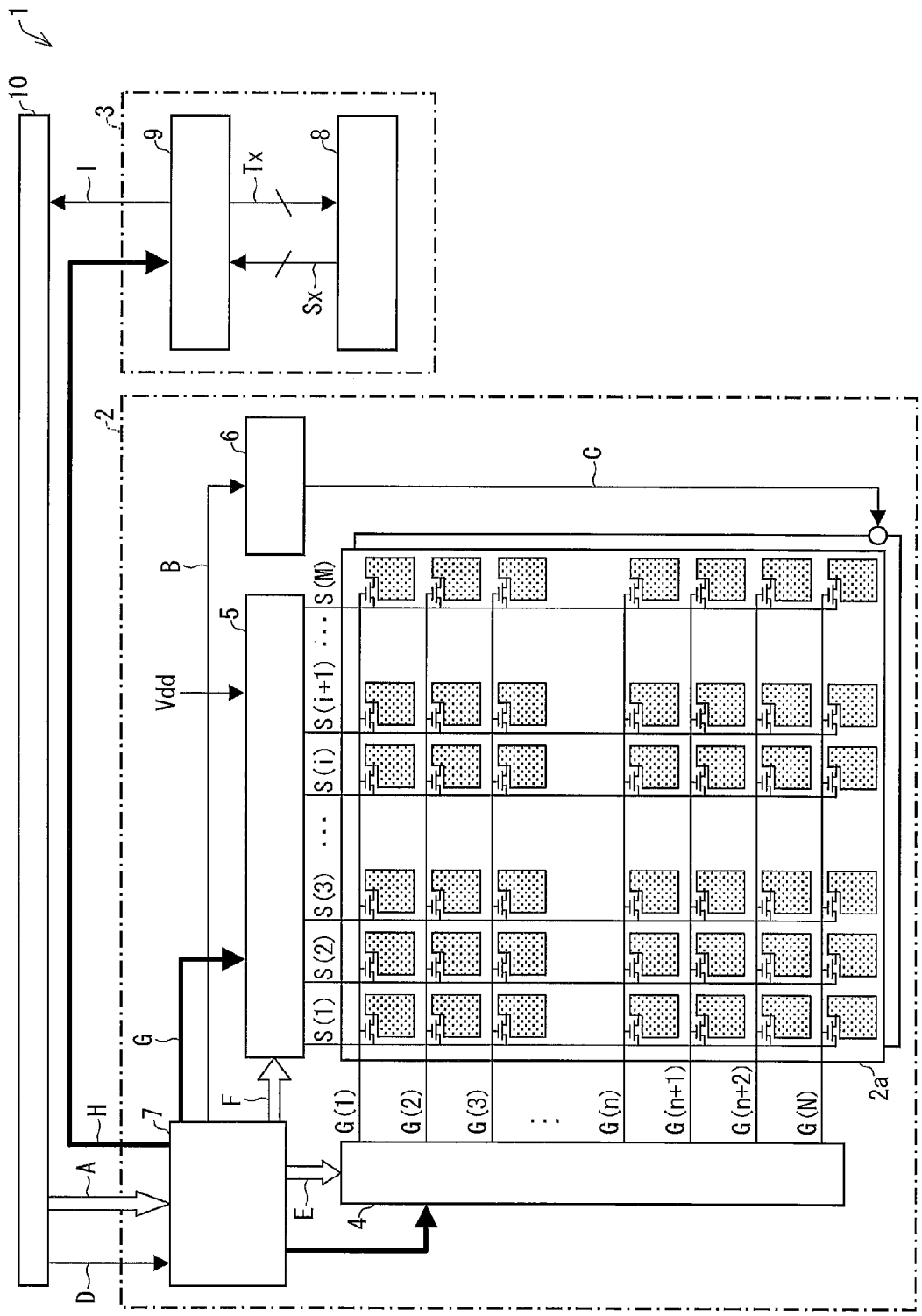
FIG. 8 is a block diagram showing in detail a configuration of a display device in accordance with an embodiment of the present invention.

With reference to FIG. 8, the following description will discuss a configuration of electronic equipment 1 in accordance with the present embodiment. FIG. 8 is a block diagram showing in detail the configuration of the electronic equipment 1 in accordance with the present embodiment. As shown in FIG. 8, the electronic equipment 1 includes a display device 2, a detection device 3, and a system-side control section 10. Furthermore, the display device 2 includes a display panel 2a, a scanning line driving circuit (gate driver, driving means) 4, a signal line driving circuit (source driver, driving means) 5, a common electrode driving circuit 6, and a timing controller (control circuit, driving means) 7. Furthermore, the detection device 3 includes a detection section 8 and a detection-section control section 9 for controlling the detection section 8.

The detection device 3 may be a touch panel provided on a screen of the display device 2.

In the present embodiment, the detection device 3 is a projected capacitive touch panel. In the case of the projected capacitive touch panel, the detection section 8 (part where detection is made) is made up of (i) a transparent substrate made of, for example, glass or plastic and (ii) transparent electrode patterns, made of ITO (Indium Tin Oxide), arranged in a matrix manner and formed on the transparent substrate. When a user's finger or the like touches or approaches a certain position of the detection section 8, capacitances at a plurality of transparent electrode patterns on and around that position change. The detection-section control section 9 (section for controlling the part where detection is made) detects a change in current or voltage of the transparent electrode patterns, thereby detecting the position where the user's finger or the like touches or approaches.

In the present embodiment, the detection device 3 is a projected capacitive touch panel. Alternatively, the detection device 3 may be a touch panel which operates in any detection method, such as a surface capacitive touch panel and a resistive touch panel. In a case where the detection device 3 is the projected capacitive touch panel, the detection section 8 has a large number of electrode patterns, and therefore tends to be influenced by driving of the display panel 2a. Therefore, applying the display device 2 of the present invention to the electronic equipment 1 having the projected capacitive touch panel would be expected to yield a more remarkable effect.

Note that the touch panel serving as the detection device 3 may detect that a user's finger or the like has touched or approached any position on the screen. In this case, the detection device 3 needs only to detect the touch or the approach, and does not need to detect the position where the touch or the approach is made.

The detection device 3 may be an RF reception device for (i) detecting a radio wave coming from outside and (ii) receiving a signal included in the radio wave. Although the detection device 3 may be, for example, a touch panel, the present invention is applicable to any detection device. Examples of the detection device, other than a touch panel, include an RF (Radio Frequency) reception device for receiving (detecting) a radio wave coming from an external device. In receiving a radio wave, the RF reception device is influenced by EMI (ElectroMagnetic Interference) emitted from a display device. Accordingly, designing the RF reception device to receive (detect) a radio wave while the display device is in a pause mode enables accuracy in the received signal to be higher.

In the case where the detection device 3 is an RF reception device, a radio wave coming from an external device is received (detected) by the detection section 8. Accordingly, the detection section 8 may include an antenna (not shown).

The display panel 2a has a screen including a plurality of pixels arranged in a matrix manner. Furthermore, the display panel 2a has N (N is any integer) scanning signal lines G (gate lines) for line-sequentially selecting and scanning the screen. Furthermore, the display panel 2a includes M (M is any integer) data signal lines S (source lines) for each supplying a data signal to pixels of one row in a selected line. The scanning signal lines G and the data signal lines S intersect each other.

G(n) in FIG. 8 indicates an n-th (n is any integer) scanning signal line G. For example, G(0), G(1), and G(2) indicate first scanning signal line G, second scanning signal line G, and third scanning signal line G, respectively. S(i) indicates an i-th (i is any integer) data signal line S. For example, S(0), S(1), and S(2) indicate first data signal line S, second data signal line S, and third data signal line S, respectively.

The scanning line driving circuit 4 sequentially scans the scanning signal lines G, for example, from the top to the bottom of the screen. At that time, the scanning line driving circuit 4 outputs, to each of the scanning signal lines G, a rectangular wave for bringing a switching element (TFT) included in a pixel and connected with a pixel electrode into an on-state. This brings pixels of one row on the screen into a selected state.

It should be noted that scanning by the scanning line driving circuit 4 is not limited to the aforementioned sequential scanning. For example, scanning may be performed in such a manner that odd-numbered scanning signal lines (first scanning signal line, third scanning signal line, fifth scanning line . . . ) are scanned and then even-numbered scanning signal lines (second scanning signal line, fourth scanning signal line, sixth scanning signal line . . . ) are scanned.

The signal line driving circuit 5 calculates values of voltages to be supplied to pixels of the selected one row, on the basis of a video signal (arrow A) supplied from the system-side control section 10, and then supplies the voltages of the values thus calculated to the respective data signal lines S. Consequently, image data is supplied to pixels on the selected scanning signal line G.

The display device 2 includes a common electrode (not shown) provided with respect to pixels in the screen. In accordance with a signal (arrow B) supplied from the timing controller 7, the common electrode driving circuit 6 supplies, to the common electrode, a predetermined common voltage for driving the common electrode (arrow C).

In accordance with a horizontal sync signal and a vertical sync signal (arrow D, video sync signal) which are supplied from the system-side control section 10, the timing controller 7 supplies, to individual circuits, a signal serving as a reference based on which the circuits operate in synchronization with each other. Specifically, in accordance with the vertical sync signal, the timing controller 7 supplies, to the scanning line driving circuit 4, a gate start pulse signal and a gate clock signal (arrow E). In accordance with the horizontal sync signal, the timing controller 7 supplies, to the signal line driving circuit 5, a source start pulse signal, a source latch strobe signal, a source clock signal, and a video signal corresponding to an input image (arrow F).

Upon receipt of the gate start pulse signal from the timing controller 7, the scanning line driving circuit 4 starts scanning the display panel 2a, and in accordance with the gate clock signal which switches the scanning signal line G to a selected state, the scanning line driving circuit 4 sequentially applies selection voltages on each of the scanning signal lines G. In accordance with the source start pulse signal received from the timing controller 7, the signal line driving circuit 5 starts a process of causing input image data for individual pixels to be stored in a register in accordance with the source clock signal. Thereafter, in accordance with a subsequent source latch strobe signal, the signal line driving circuit 5 supplies an image data signal to each of the data signal lines S provided in the display panel 2a. The supply of the image data signal is carried out by, for example, an analog amplifier included in the signal line driving circuit 5.

The timing controller 7 supplies, to the signal line driving circuit 5, a pause driving control signal (arrow G) for controlling whether to pause the analog amplifier. Along with this, the timing controller 7 supplies, to the detection section control section 9 of the detection device 3, a TP detection operation control signal (arrow H) corresponding to the pause driving control signal.

In the detection device 3, in response to reception of the TP detection operation control signal by the detection section control section 9, the detection section 8 carries out detection. The detection section control section 9 having received the TP detection operation control signal drives the detection section 8 via a driving line Tx.

As described above, the detection section 8 is, for example, a projected capacitive touch panel, and detects a position where a finger of a human including a user (user of the electronic equipment 1) or a stylus (pen) touches or approaches. In response to tracing (touching) of the detection section 8 with the human finger or the stylus, the detection section 8 detects a human's operation corresponding to the tracing movement (touching movement).

It should be noted that the aforementioned "human" is not limited to a user of the electronic equipment 1. For example, an observer or the like who observes the display device 2 of the electronic equipment 1 together with the user of the electronic equipment 1 is also encompassed in the aforementioned "human".

A detection result thus obtained by the detection section 8 is transmitted to the detection section control section 9 via a sense line Rx. The detection section control section 9 transmits the detection result thus received as detected data (arrow I) to the system-side control section 10.

Voltages required for operations of the circuits provided in the display device 2 are supplied from, for example, a power generation circuit (not shown). The power generation circuit may be included in the system-side control section 10. In this case, voltages are supplied from the system-side control section 10 to the display device 2, and voltages are supplied from the system-side control section 10 to the detection device 3. As an example of a voltage required for operations of the circuits provided in the display device 2, a power supply voltage Vdd is supplied to the signal line driving circuit 5.

As described above, in the display device 2 of the electronic equipment 1 in accordance with the present embodiment, the plurality of pixels are provided in such a manner as to respectively correspond to intersections of the plurality of scanning signal lines G extending in one direction and the plurality of data signal lines S extending in the other direction.

Furthermore, the display device 2 of the electronic equipment 1 includes the scanning line driving circuit 4 for sequentially applying, on the scanning signal lines G, the gate clock signal (selection signal) for switching the scanning signal line G to a selected state.

Furthermore, the display device 2 of the electronic equipment 1 includes the signal line driving circuit 5 for supplying the image data signal to each of the data signal lines S.

Furthermore, the display device 2 of the electronic equipment 1 includes the timing controller 7. In accordance with a vertical sync signal supplied from outside (i.e. from the system-side control section 10), the timing controller 7 supplies the selection signal to the scanning line driving circuit 4. Along with this, in accordance with a horizontal sync signal supplied from outside (i.e. from the system-side control section 10), the timing controller 7 supplies, to the signal line driving circuit 5, a source latch strobe signal (supply instruction signal) for instructing the signal line driving circuit 5 to supply the image data signal.

The timing controller 7 (detection instructing circuit) supplies, a TP detection operation control signal (detection operation control signal) to the detection device 3 plural times in at least one of non-scanning periods, the TP detection operation control signal being a signal for instructing the detection device 3 to make detections of at least one of detection targets which are (i) an input made by a touch of the screen or an approach to the screen and (ii) a radio wave coming from outside the display device.

With reference to FIGS. 1 to 10, the following description will discuss a method for driving the display device 2 in accordance with the present embodiment.

Example 1

Figure 1:
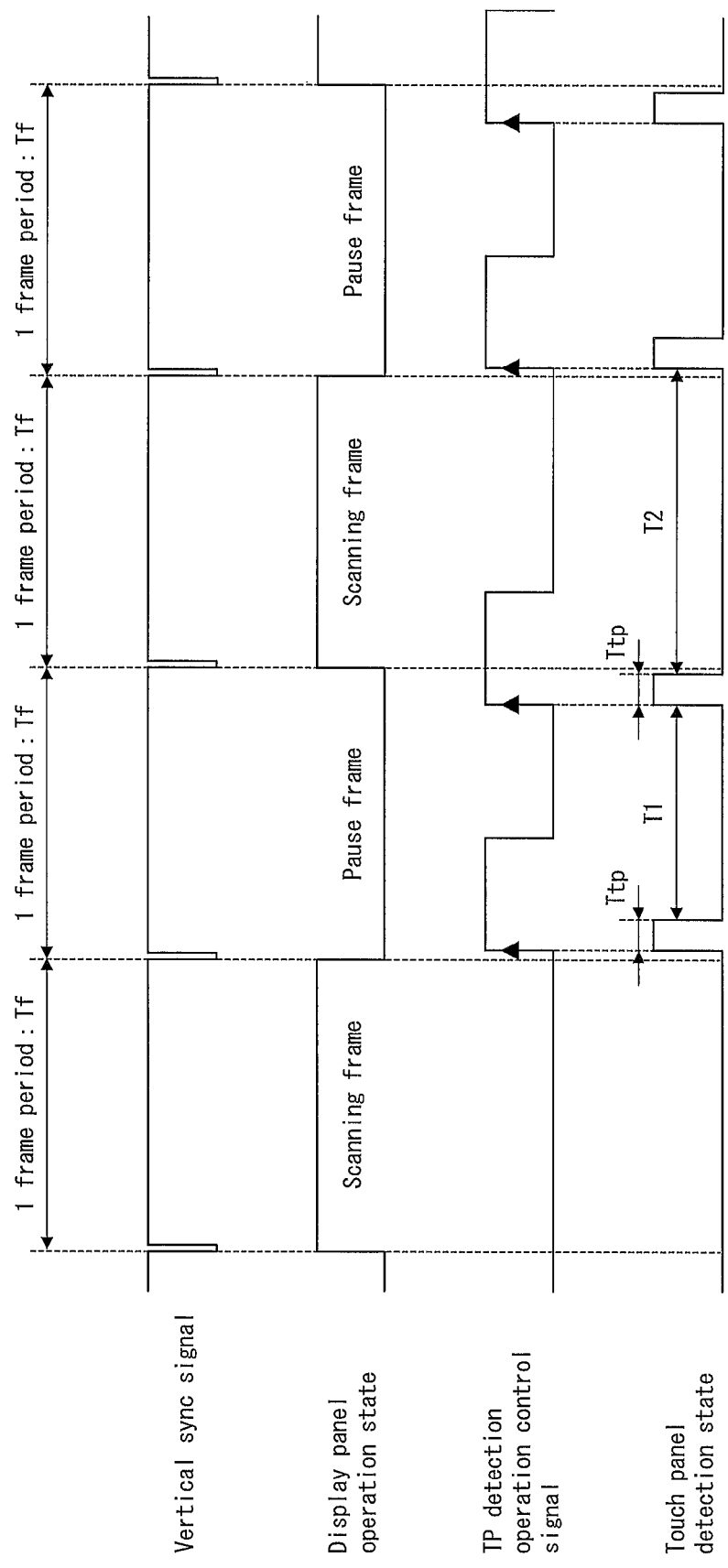
FIG. 1 is a timing chart showing a method for driving a display device of Example of the present invention.

FIG. 1 is a timing chart showing a method for driving the display device 2 of Example 1.

In the display device 2, a vertical sync signal supplied from the system-side control section 10 to the timing controller 7 includes one pulse per one frame period Tf.

One frame period Tf herein includes not only a period during which image data of one frame is scanned but also a blanking period and the like period(s).

In a case where the display device 2 does not include a frame memory, one frame period Tf is substantially equal to one cycle of the vertical sync signal. There may be a certain time difference between one frame period Tf and one cycle of the vertical sync signal with reference to the vertical sync signal (e.g. a certain time difference resulting from processing of image data).

In a case where the display device 2 includes a frame memory, there may be a difference between one frame period Tf before input to the frame memory and another one frame period Tf after the input to the frame memory.

As described above, one frame period Tf in FIG. 1 is merely an example, and one frame period Tf is not necessarily equal to one cycle of the vertical sync signal.

In a case where the display device 2 includes the frame memory, the frame memory is provided, for example, in the timing controller 7. In this case, the timing controller 7 includes a clock generation circuit. For one horizontal period and one vertical period of predetermined durations, scanning is carried out with reference to a clock signal generated in the clock generation circuit. This allows providing a display without depending on a sync signal supplied from outside the display device 2. Alternatively, scanning may be carried out based on a sync signal, on the assumption that the display device 2 includes a frame memory.

The pulse is explained below. At a start time of any one frame period Tf, the level of the vertical sync signal changes, for example, from a high level to a low level. The change in signal level corresponds to a fall of the pulse. Similarly, at a start time of another one frame period Tf following the aforementioned one frame period Tf, the level of the vertical sync signal changes, for example, from a high level to a low level.

Due to the aforementioned change in signal level in each one frame period Tf, the vertical sync signal has the pulse per one frame period Tf.

The display panel 2a of the display device 2 of Example 1 can alternately assume a first state and a second state. The following description will discuss the first state and the second state.

In the first state, in one frame period Tf, scanning is carried out in such a manner that a plurality of pixels in the display panel 2a are sequentially brought into a selected state. A period (scanning period) during which the display panel 2a is in the first state is indicated as SCANNING FRAME in FIG. 1.

In the second state, in one frame period Tf, scanning is not carried out at all with respect to all the pixels in the display panel 2a. A period (non-scanning period) during which the display panel 2a is in the second state is indicated as PAUSE FRAME in FIG. 1.

As described above, in the display panel 2a of the display device 2 of Example 1, the scanning frame and the pause frame are repeatedly alternated.

Figure 16:
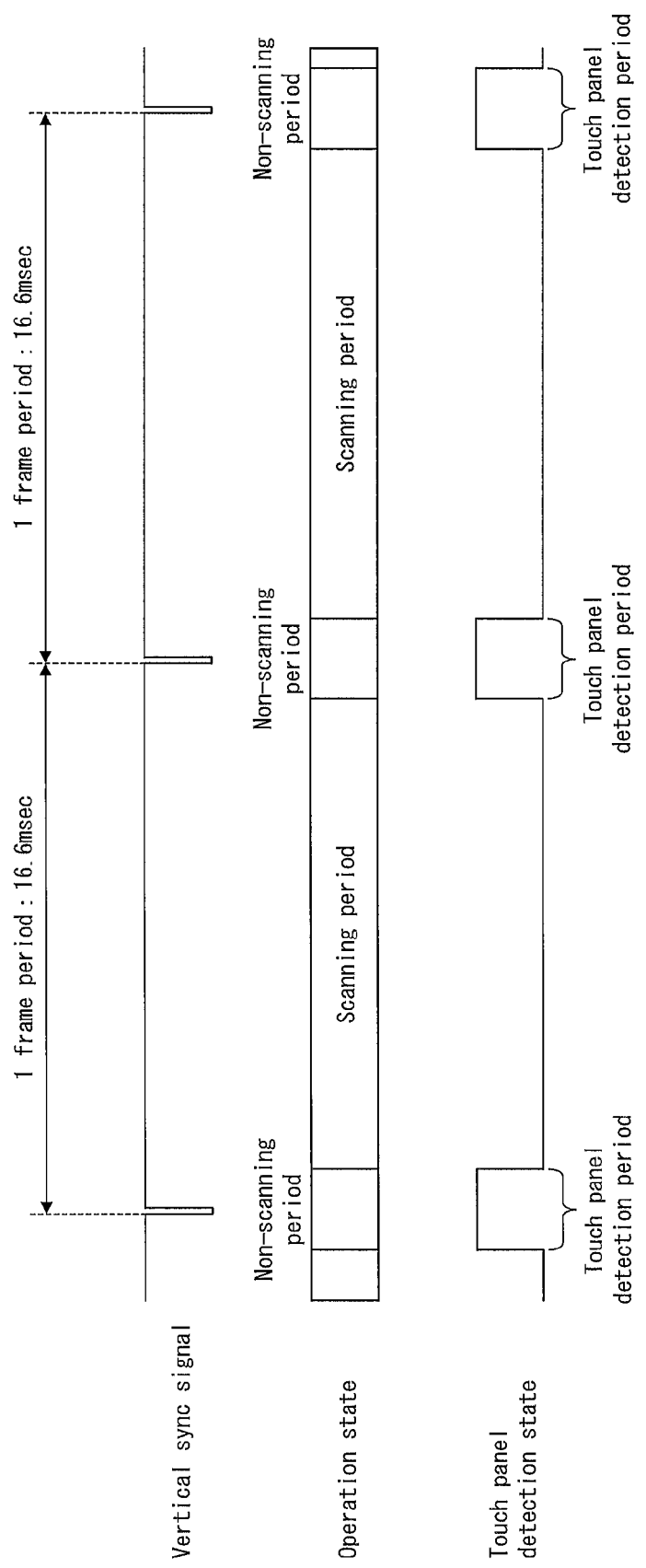
FIG. 16 is a timing chart showing a first conventional art example.
Figure 17:
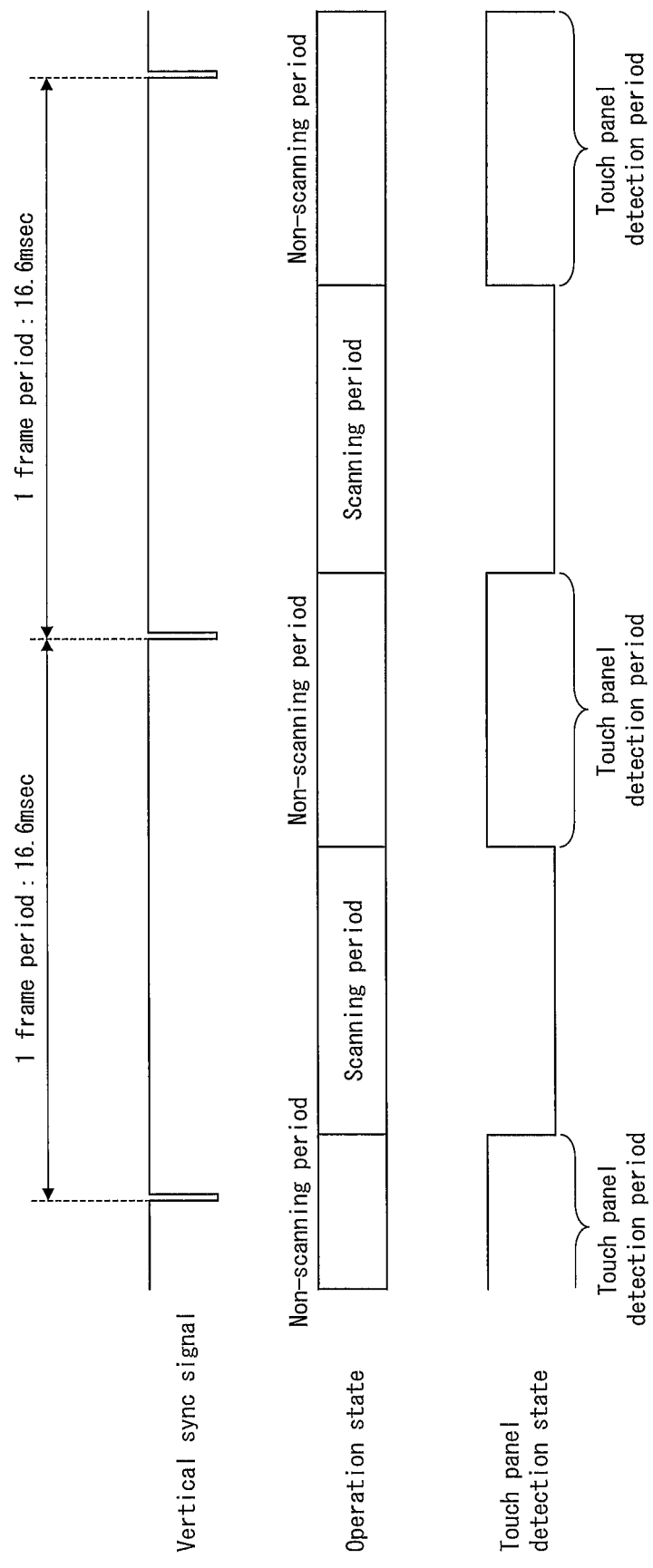
FIG. 17 is a timing chart showing a second conventional art example.
Figure 18:
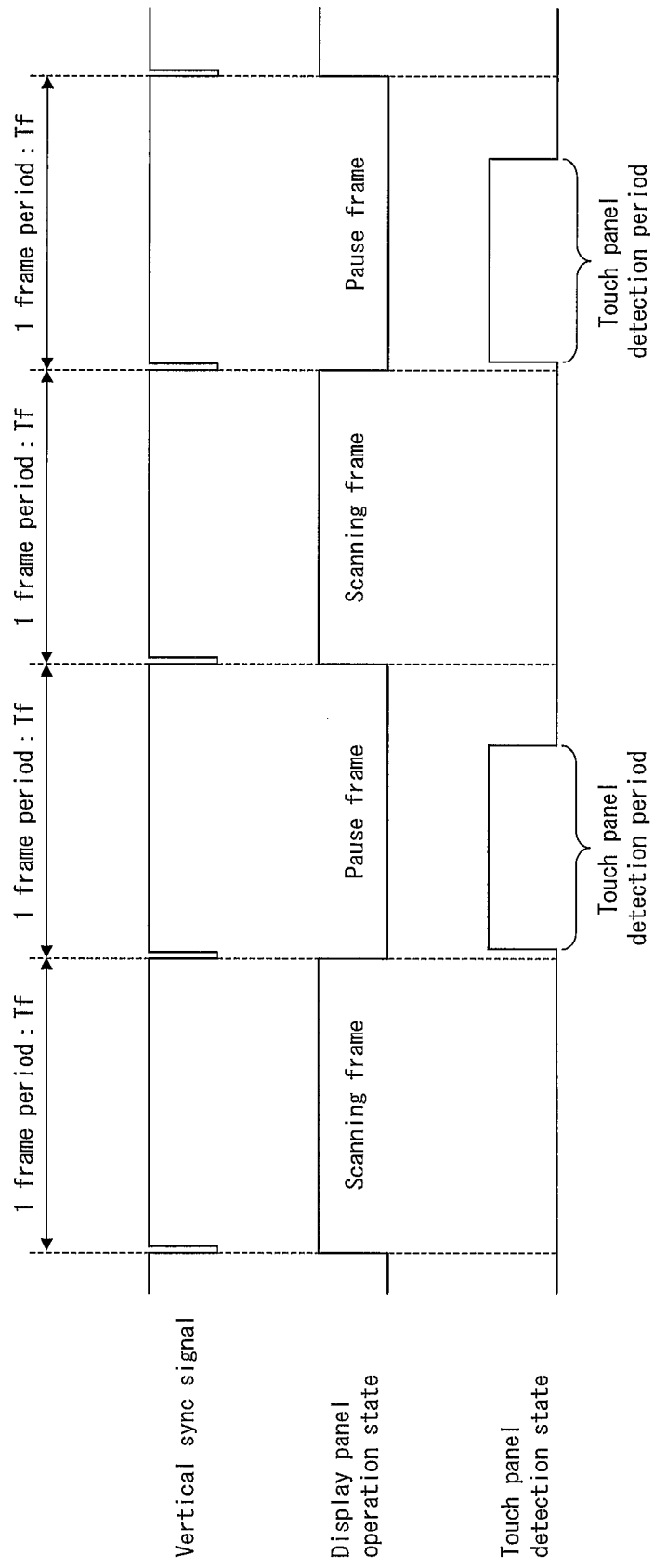
FIG. 18 is a timing chart showing a third conventional art example.

According to the conventional method for driving a display device, as shown in FIGS. 16 to 18, detection of a user's operation was made only once per one non-scanning period.

In contrast thereto, according to the method for driving the display device 2 of Example 1, the display device 2 is driven as follows. In a pause frame of the display panel 2a, a TP detection operation control signal supplied from the timing controller 7 to the detection-section control section 9 of the detection device 3 has a plurality of pulses (in FIG. 1, two pulses) for each instructing the detection device 3 to make detection. Accordingly, the detection section 8 which is, for example, a projected capacitive touch panel makes detection plural times (FIG. 1 illustrates that detection is made twice) in the pause frame (i.e. non-scanning period).

In FIG. 1, a touch panel detection period Ttp (period required for detection made by the detection section 8) shown in a waveform indicating a touch panel detection state is shorter than a touch panel detection period illustrated in FIG. 18. A description will be provided below in this regard. Recently, there has been developed a technique for greatly shortening a touch panel detection period (specifically, a technique for reducing the duration of the touch panel detection period to approximately 1 msec). Accordingly, as shown in FIG. 1, a plurality of detections can be achieved in one pause frame.

The start time and the end time of the touch panel detection period Ttp need only to fall within a period during which the detection operation control signal is active. That is, as shown in FIG. 1, the start time of the touch panel detection period Ttp needs only to be in sync with a time when the TP detection operation control signal rises.

Therefore, a touch panel detection period Ttp of a predetermined duration may start at a time when the TP detection operation control signal rises, so that detection is made during such a touch panel detection period Ttp. The duration of the touch panel detection period Ttp may be predetermined by, for example, the detection device 3.

Assume that in the display device 2 of Example 1, detection is made twice in each of all the pause frames. In this case, a refresh frequency is represented by $$1/(2 \times Tf) \qquad (2)$$

because one frame period is Tf and one refresh is performed per two frame periods (2×Tf) consisting of (i) one scanning frame and (ii) following one pause frame.

On the other hand, in the display device 2 of Example 1, the detection section 8 carries out detection twice per two frame periods (2×Tf) consisting of (i) one scanning frame and (ii) following one pause frame. Accordingly, a detection frequency indicative of how many times detection is made by the detection section 8 is represented by the equation:

$$2/(2 \times Tf) \quad (3)$$

which is a double of the refresh frequency represented by the equation (2).

This makes it possible to set the detection frequency to 120 Hz in a case where the refresh frequency is, for example, 60 Hz. Consequently, it is possible to deal with handwriting which requires a detection frequency of 100 Hz or more.

The detection frequency which is twice higher than the refresh frequency occurs in a case where detection is made twice in each of all the pause frames. Note that the method for driving the display device of Example 1 is not limited to this case. One example is shown below.

Assume that there are 60 scanning frames and 60 pause frames, constituting 120 frames in total. Alternate repetition of the scanning frame and the pause frame is carried out as in the cases represented by the equations (2) and (3).

In this case, the refresh frequency of the display device 2 of Example 1 is represented by the equation:

$$60/(120 \times Tf) \quad (4)$$

because refresh is made 60 times throughout 120 frame periods (120×Tf).

Here, assume that detection is made twice in only one pause frame of the 60 pause frames and once in the other 59 pause frames. In this case, in the display device 2 of Example 1, detection by the detection section 8 is made 61 times throughout 120 frame periods (120×Tf). That is, since detection is made twice in only one pause frame and once in the other 59 pause frames, the number of detections is incremented by one (1).

Therefore, the detection frequency indicative of how many times detection is made by the detection section 8 is represented by $$61/(120 \times Tf) \quad (5)$$

which is higher than the refresh frequency represented by the equation (4).

The detection frequency represented by the equation (5) is a frequency in the case where detection is made twice in only one frame of the 60 pause frames and once in the other 59 pause frames. Alternatively, by providing two or more pause frames where detection is made twice, it is possible to further increase detection frequency.

As described above, the display device 2 of Example 1 is arranged such that the detection operation control signal for instructing the detection device 3 to make detection is outputted plural times in at least one pause frame. That is, the method for driving the display device 2 of Example 1 includes a step of outputting the detection operation control signal plural times in at least one pause frame.

This allows the detection frequency indicative of how many times the detection is made to be higher than (e.g. twice higher than) the refresh frequency indicative of how many times the plurality of pixels are updated.

Therefore, in a case where the refresh frequency is, for example, 60 Hz, the detection frequency of 120 Hz can be realized. Accordingly, it is possible to deal with handwriting which requires a detection frequency of 100 Hz or more.

The detection frequency can be made twice larger than the refresh frequency, but the detection frequency can also be adjusted in the range of 61 Hz to 120 Hz when the refresh frequency is 60 Hz.

All the detections are made in the pause frames. Accordingly, each touch panel detection period Ttp is included in any of the pause frames. This enables the detection device 3 to be free from the influence of noises which are caused by scanning carried out in the display device 2 during the scanning frame. This allows greatly increasing accuracy in the detection.

Therefore, it is possible to provide the display device 2 which enables a detection device to make detection with a frequency higher than a refresh frequency of the display device and with improved detection accuracy, and to provide a method for driving the display device 2.

The detection device 3 may determine timings for individual detections so as to minimize a difference between (i) an interval between two consecutive detections made in a corresponding one of the pause frames and (ii) an interval between two consecutive detections in a period including the scanning period. To take, as an example, the driving manner shown in the timing chart of FIG. 1, the detection device 3 determines timings for individual detections in such a manner that the time period T1 and the time period T2 are minimized.

This allows the interval between two consecutive detections to be increased as much as possible and allows the interval to be made as close to constant as possible, thereby realizing nearly regular detections.

In Example 1, since a period during which all the pixels in the display panel 2a are scanned, i.e. a scanning period, is equal to one frame period Tf, the scanning period is referred to as a scanning frame. Similarly, since a period during which no pixel is scanned, i.e. a non-scanning period, is equal to one frame period Tf, the non-scanning period is referred to as a pause frame.

However, as can be seen from later-mentioned Example 5, it is obvious that the scanning period and the non-scanning period are not limited to one frame period Tf. The inventive concept lies in that in repeated alternation between the scanning period and the non-scanning period, the detection section 8 makes detection plural times in at least one non-scanning period, so that a detection frequency is made higher than a refresh frequency.

The display device 2 of Example 1 may be arranged such that the scanning line driving circuit 4, the signal line driving circuit 5, and the timing controller 7 invert the polarities of voltages to be applied to the pixels during the scanning period. This allows improving detection accuracy and reducing power consumption of the detection device 3 in a case where dot inversion driving which requires high current consumption during the scanning period is made.

The following description will discuss the polarity inversion driving in the display device 2. Displaying the same image on the same position for a long time would result in burn-in of the image on the screen. In order to avoid this, it is desirable that pixel electrodes provided in the display panel 2a invert the polarity of a voltage once in a predetermined number of frame periods (e.g. once in one frame period). An inversion method in which voltages with the same polarity are applied on all the pixel electrodes in the display panel 2a in one frame, voltages with the opposite polarity are applied on all the pixel electrodes in a next frame, and these processes are repeated subsequently is called "frame inversion". The frame inversion can be realized by inverting the polarities of voltages to be applied on all the data signal lines S in one frame on a per-frame-period basis.

Furthermore, in order to prevent the occurrence of flickers, it is desirable that the polarity of a voltage is inverted with respect to each of pixel electrodes arranged in at least one of a direction along which the scanning signal lines G extend and a direction along which the data signal lines S extend. Examples of such inversion include "source inversion", "line inversion", and "dot inversion". These inversions are detailed below with reference to FIGS. 11 to 14.

FIGS. 11 to 14 are structural views showing structures of the scanning signal lines G, the data signal lines S, and the pixel electrodes in the display panel 2a. In each of FIGS. 11 to 14, (a) shows the polarities of voltages to be applied to individual pixel electrodes in one frame (n-th frame), and (b) shows the polarities of voltages to be applied to individual pixel electrodes to which voltages of opposite polarities are applied in the next frame (n+1-th frame). The polarities of voltages to be applied to individual pixel electrodes are indicated by '+' (positive) and '−' (negative) in the drawings.

Figure 11:
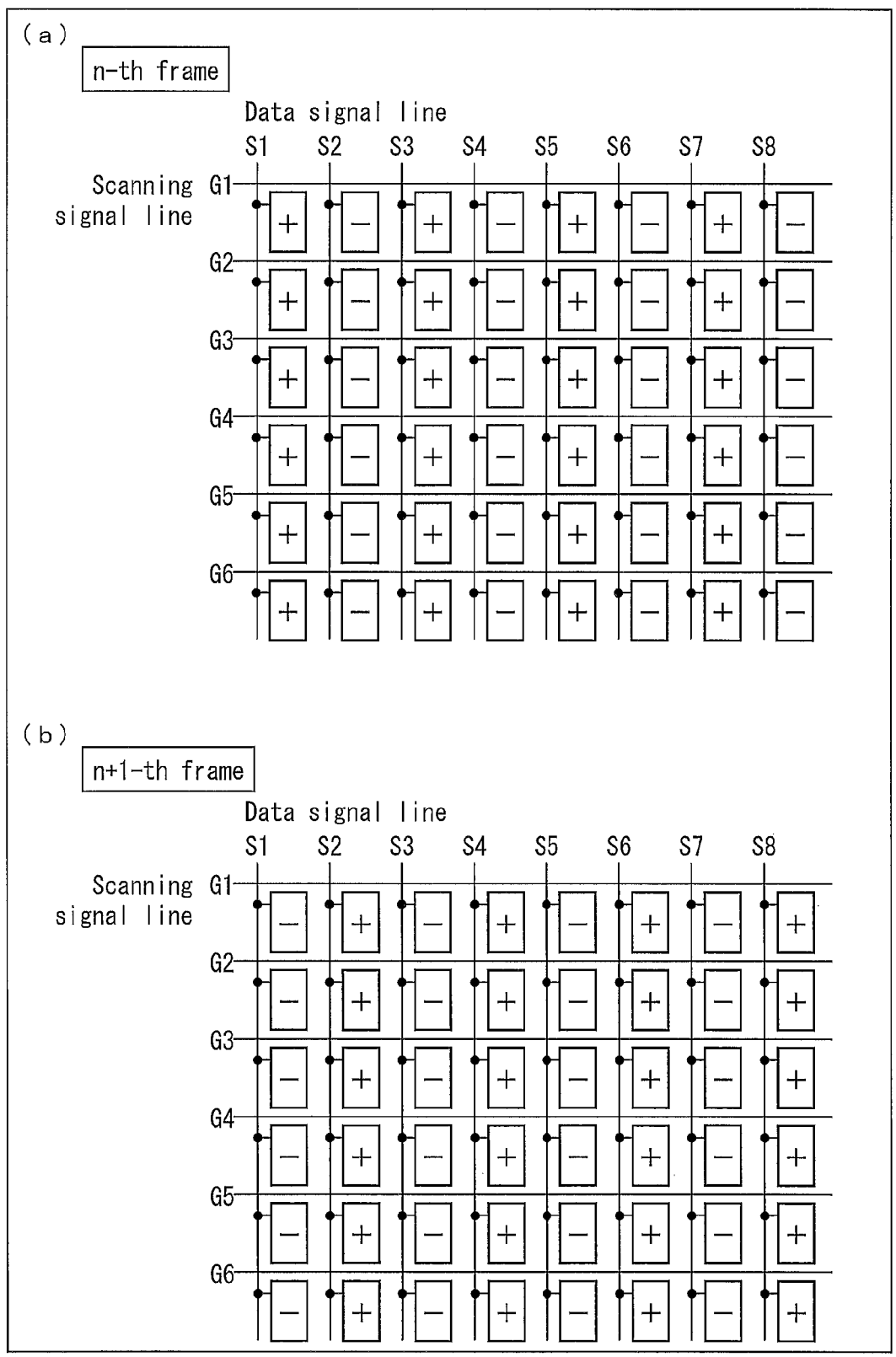
FIG. 11 is a structural view showing structures of scanning signal lines, data signal lines, and pixel electrodes in a display panel. (a) of FIG. 11 shows polarities of voltages applied to pixel electrodes in a certain frame (n-th frame). (b) of FIG. 11 shows polarities of voltages applied to the pixel electrodes in a case where source inversion is made in the next frame (n+1-th frame).

FIG. 11 shows an example of source inversion. The source inversion is made by inverting the polarity of a voltage to be applied with respect to each data signal line (source line) S. This allows inverting the polarity of a voltage with respect to each of pixel electrodes arranged in the direction along which the scanning signal line G extends, as shown in FIG. 11.

Figure 12:
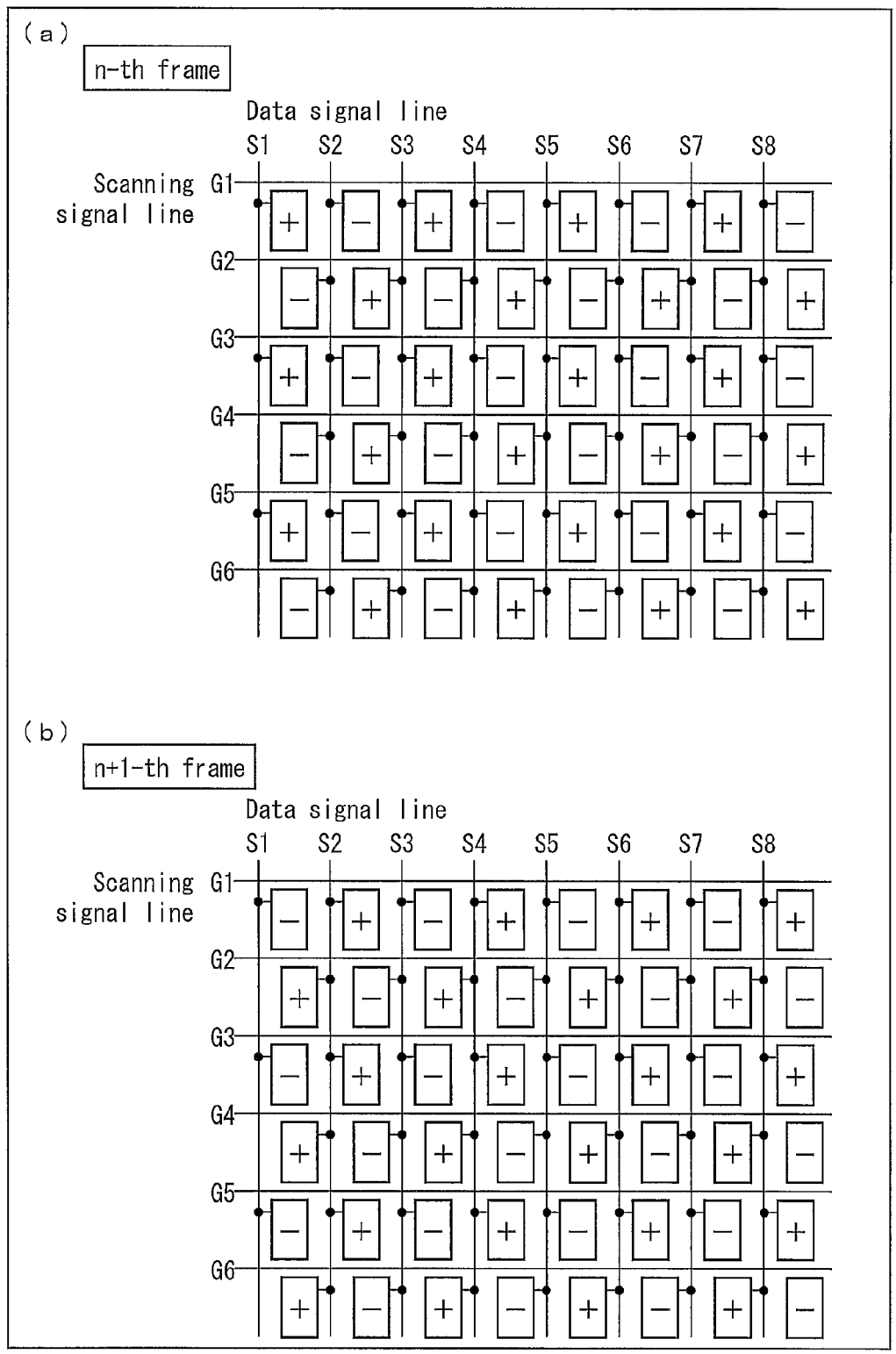
FIG. 12 is a structural view showing structures of scanning signal lines, data signal lines, and pixel electrodes in a display panel. (a) of FIG. 12 shows polarities of voltages applied to pixel electrodes in a certain frame (n-th frame). (b) of FIG. 12 shows polarities of voltages applied to the pixel electrodes in a case where source inversion is made in the next frame (n+1-th frame).

FIG. 12 shows source inversion performed similarly with the case of FIG. 11, but is different from the case of FIG. 11 in terms of the configuration of pixel electrodes. In FIG. 11, the pixel electrodes connected with the data signal line S are positioned on one side (right side in FIG. 11) of the data signal line S, whereas in FIG. 12, pixel electrodes connected with the data signal line S are positioned in a zigzag manner with respect to the data signal line S. Consequently, in the FIG. 11 configuration, the polarities of voltages applied to pixel electrodes positioned between two adjacent data signal lines S are the same as each other, whereas in the FIG. 12 configuration, the polarities of voltages applied to pixel electrodes positioned between two adjacent data signal lines S change alternately.

Figure 13:
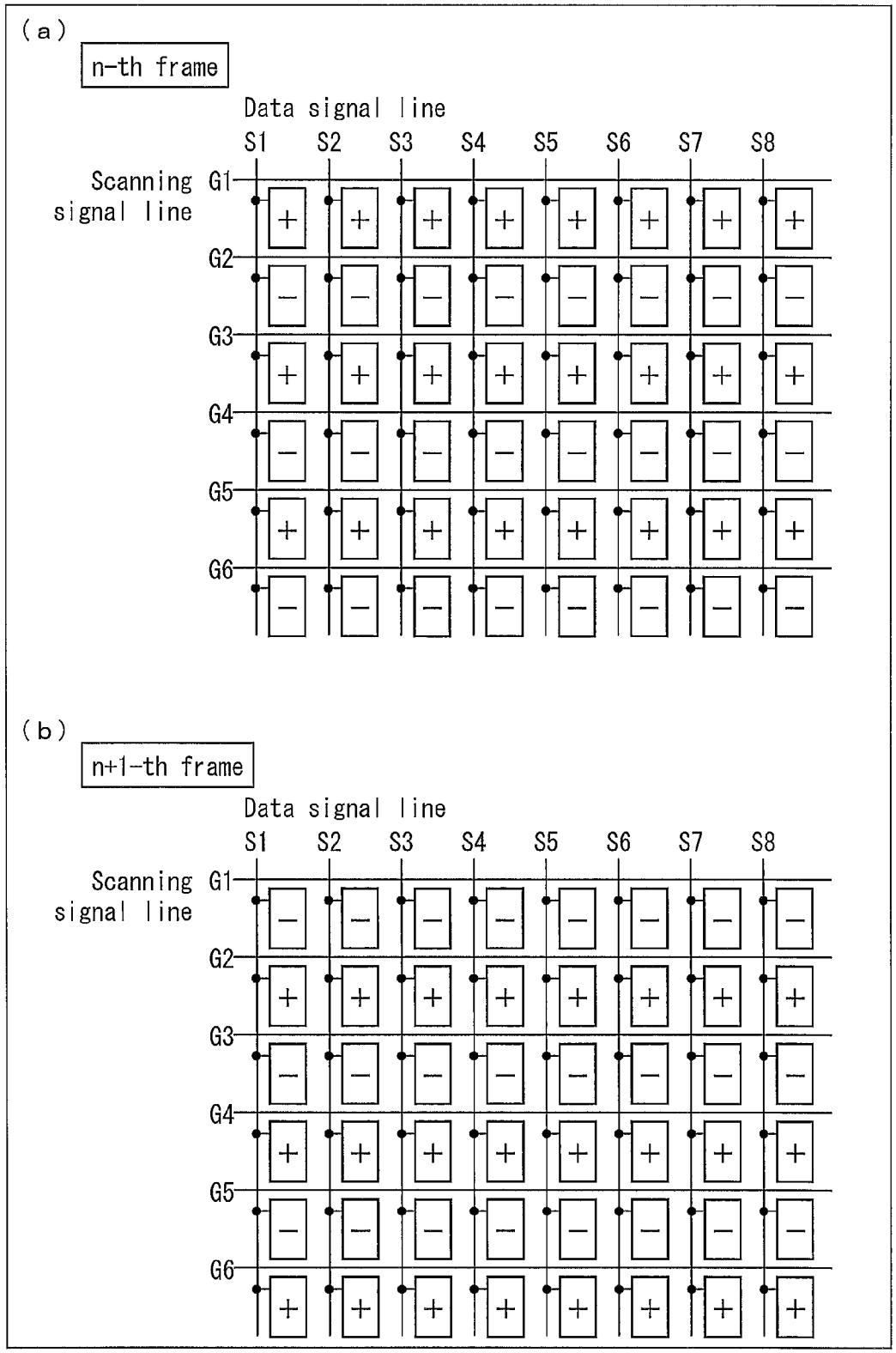
FIG. 13 is a structural view showing structures of scanning signal lines, data signal lines, and pixel electrodes in a display panel. (a) of FIG. 13 shows polarities of voltages applied to pixel electrodes in a certain frame (n-th frame). (b) of FIG. 13 shows polarities of voltages applied to the pixel electrodes in a case where line inversion is made in the next frame (n+l-th frame).

FIG. 13 shows an example of line inversion. The line inversion is made by inverting the polarity of a voltage to be applied to the data signal line S with respect to each scanning signal line G being driven (once in each horizontal scanning period). This allows inverting the polarity of a voltage with respect to each of pixel electrodes arranged in the direction along which the data signal line S extends, as shown in FIG. 11.

Figure 14:
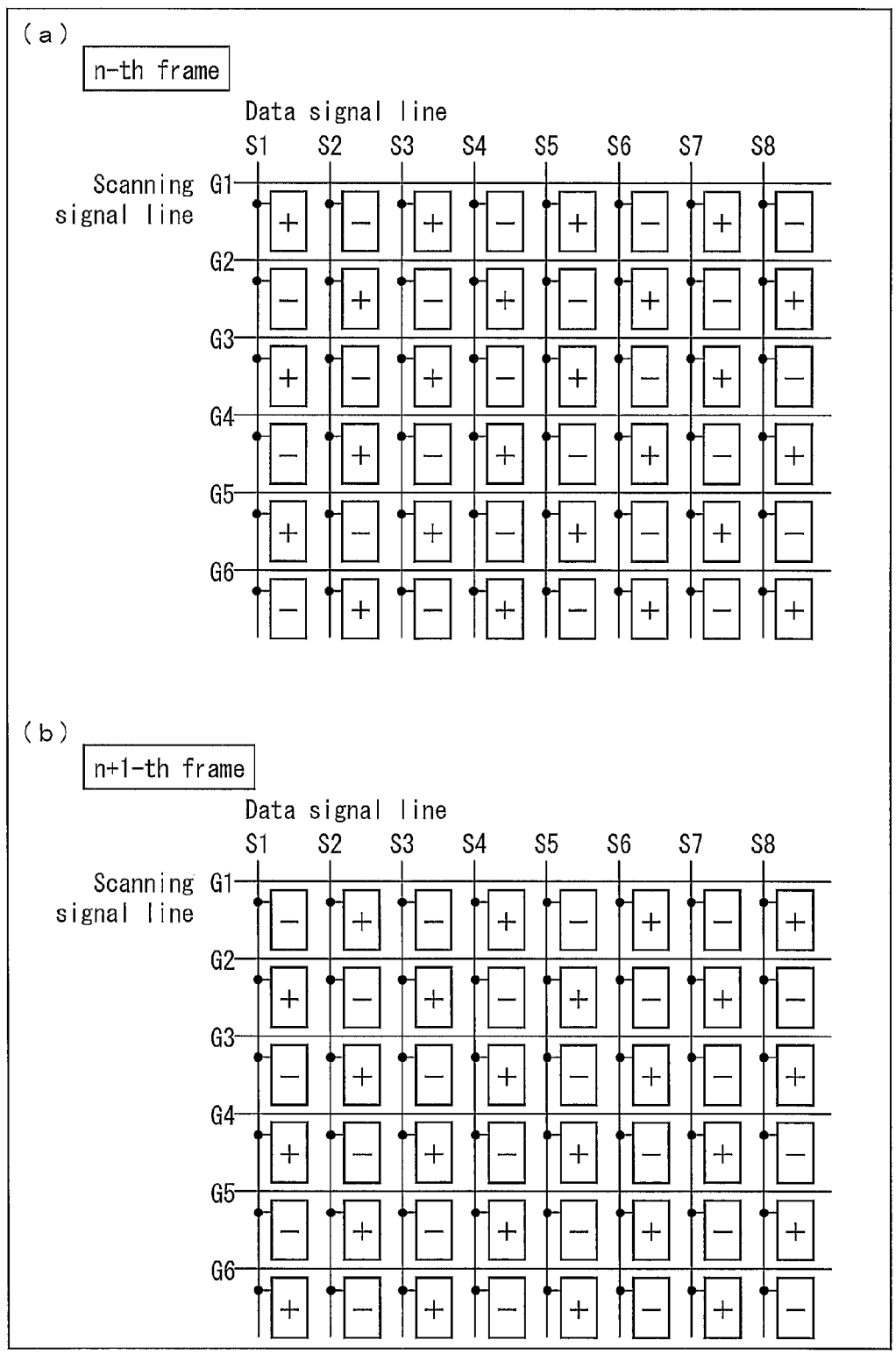
FIG. 14 is a structural view showing structures of scanning signal lines, data signal lines, and pixel electrodes in a display panel. (a) of FIG. 14 shows polarities of voltages applied to pixel electrodes in a certain frame (n-th frame). (b) of FIG. 14 shows polarities of voltages applied to the pixel electrodes in a case where dot inversion is made in the next frame (n+l-th frame).

FIG. 14 shows an example of dot inversion. The dot inversion can be realized by combining the source inversion shown in FIG. 11 with the line inversion shown in FIG. 13. Specifically, in driving the first scanning signal line G1, the polarities of voltages to be applied to the data signal lines S are set in such a manner that the polarity of a voltage to be applied to the first data signal line is positive (+), and the polarities of voltages to be applied to subsequent data signal lines are inverted alternately. Next, in driving the second scanning signal line G2, the polarities of voltages to be applied to the data signal lines S are set in such a manner that the polarity of a voltage to be applied to the first data signal line is negative (−) and the polarities of voltages to be applied to subsequent data signal lines are inverted alternately. In driving the third and subsequent scanning signal lines G, the inversion is repeated similarly, so that the polarities of voltages to be applied to pixel electrodes which are adjacent to each other in the direction along which the scanning signal line G extends and in the direction along which the data signal line S extends can be different from each other.

Example 2

Figure 2:
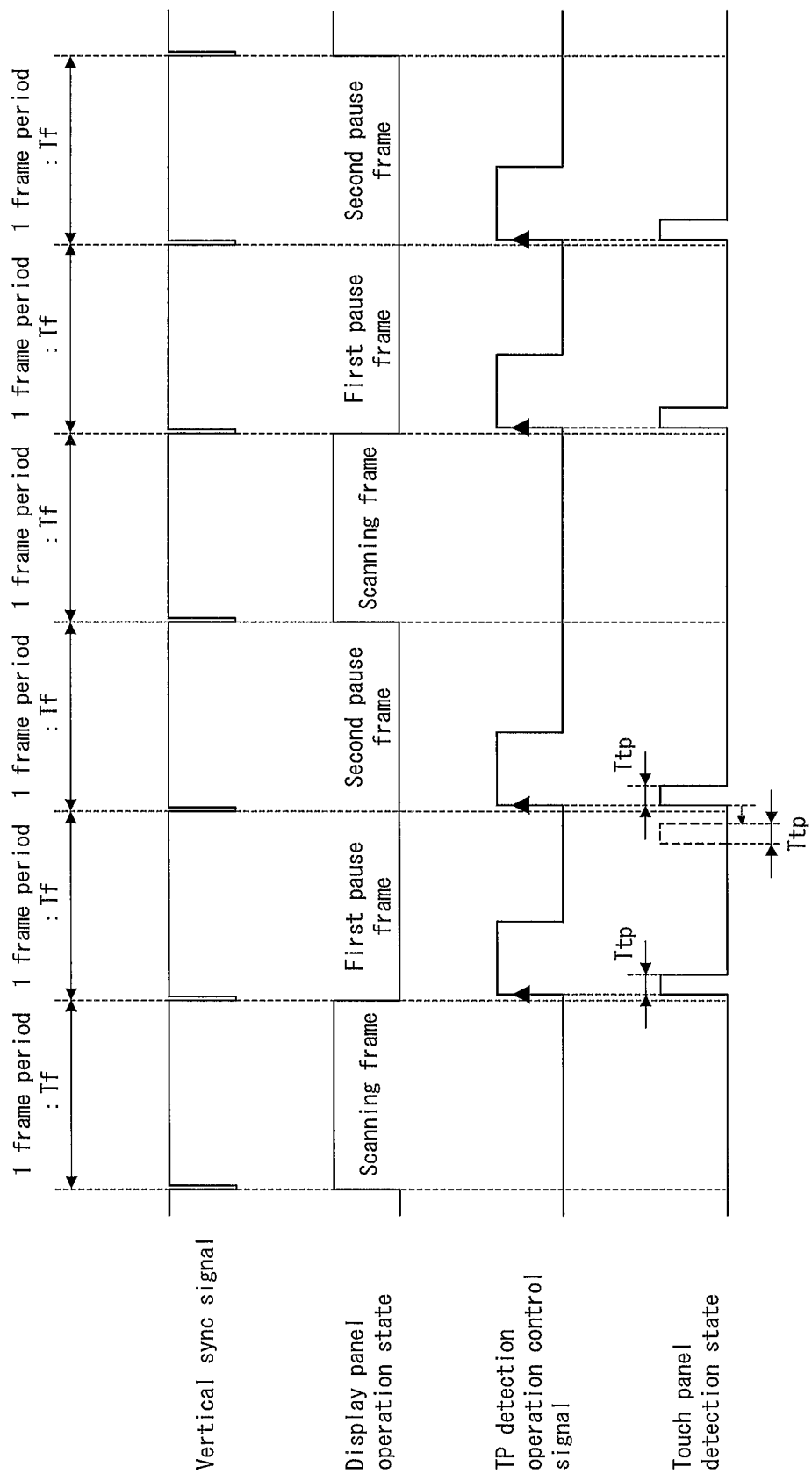
FIG. 2 is a timing chart showing a method for driving a display device in accordance with another Example of the present invention.

FIG. 2 is a timing chart showing a method for driving a display device 2 of Example 2.

In Example 1, a non-scanning period is equal to one frame period Tf consisting of one pause frame. In contrast thereto, in the method for driving the display device 2 of Example 2, a non-scanning period includes a plurality of pause frames (non-scanning period which is (equivalent to) a multiple of one frame period Tf).

FIG. 2 shows an example of such a non-scanning period. In a display panel 2a of the display device 2 of Example 2, a scanning frame is followed by two pause frames, i.e. a first pause frame (first frame period) and a second pause frame (second frame period).

In this case, in the method for driving the display device 2 of Example 2, the non-scanning period is a period of integer-multiple (a period equivalent to an integer-multiple) of one frame period Tf (in FIG. 2, a period of a double of one frame period Tf (period equivalent to a double of one frame period Tf, 2×Tf)). In at least one of such non-scanning periods, detection is made plural times similarly with Example 1.

In the example shown in FIG. 2, detection is made once in a first pause frame, and detection is made once in a second pause frame, so that detection is made twice throughout the whole non-scanning period consisting of two frame periods (2×Tf).

As described above, in the method for driving the display device 2 of Example 2, detection is made plural times throughout the whole non-scanning period consisting of integer-multiple pause frames.

This allows a detection frequency indicative of how many times the detection is made to be higher than a refresh frequency indicative of how many times the plurality of pixels are updated.

Furthermore, it is unnecessary to make detection plural times in each of the pause frames (all the pause periods each equivalent in length to a scanning period). This allows for reduction in power consumption of the detection device 3 including the detection section 8 which is, for example, a projected capacitive touch panel.

In the example shown in FIG. 2, a detection start timing in the first pause frame is identical to a detection start timing in the second pause frame. That is, a time period from when a vertical sync signal rises to when detection starts in the first pause frame is equal to a time period from when a vertical sync signal rises to when detection starts in the second pause frame.

It should be noted that it is unnecessary to make at least one detection in each pause frame. That is, in FIG. 2, a touch panel detection period Ttp in the second pause frame may be moved to a position in the first pause frame (as indicated by a broken line in the touch panel detection state of FIG. 2).

Consequently, detection is made twice in the first pause frame, while no detection is made in the second pause frame. In this case, detection can be made twice throughout the whole non-scanning period consisting of two frame periods (2×Tf).

In order to realize the method for driving the display device 2 of Example 2, it is necessary to transmit, to the detection device 3, information on how many pause frames a non-scanning period consists of. The information is grasped by the display device 2.

Therefore, for example, the information may be transmitted via the same route as a route via which a TP detection operation control signal is transmitted (arrow H), that is, from the timing controller 7 to the detection section control section 9 of the detection device 3. Alternatively, the detection device 3 may include a function of obtaining the information from the display device 2. Furthermore, transmission of the information from the timing controller 7 may be carried out via a route passing through the system-side control section 10 and the detection section control section 9 in this order.

Velocity information which is information on increase in velocity of movement of the human finger or the stylus on the detection section 8 can be obtained from a change in positional coordinates of the human finger or the stylus moved over the detection section 8.

The number of times the detection device 3 makes detection may be determined in accordance with the velocity information. For example, in a case where the velocity of movement of the human finger or the stylus increases, the number of times the detection device 3 makes the detection may be increased, as compared to that before the velocity of movement increases.

Example 3

Figure 3:
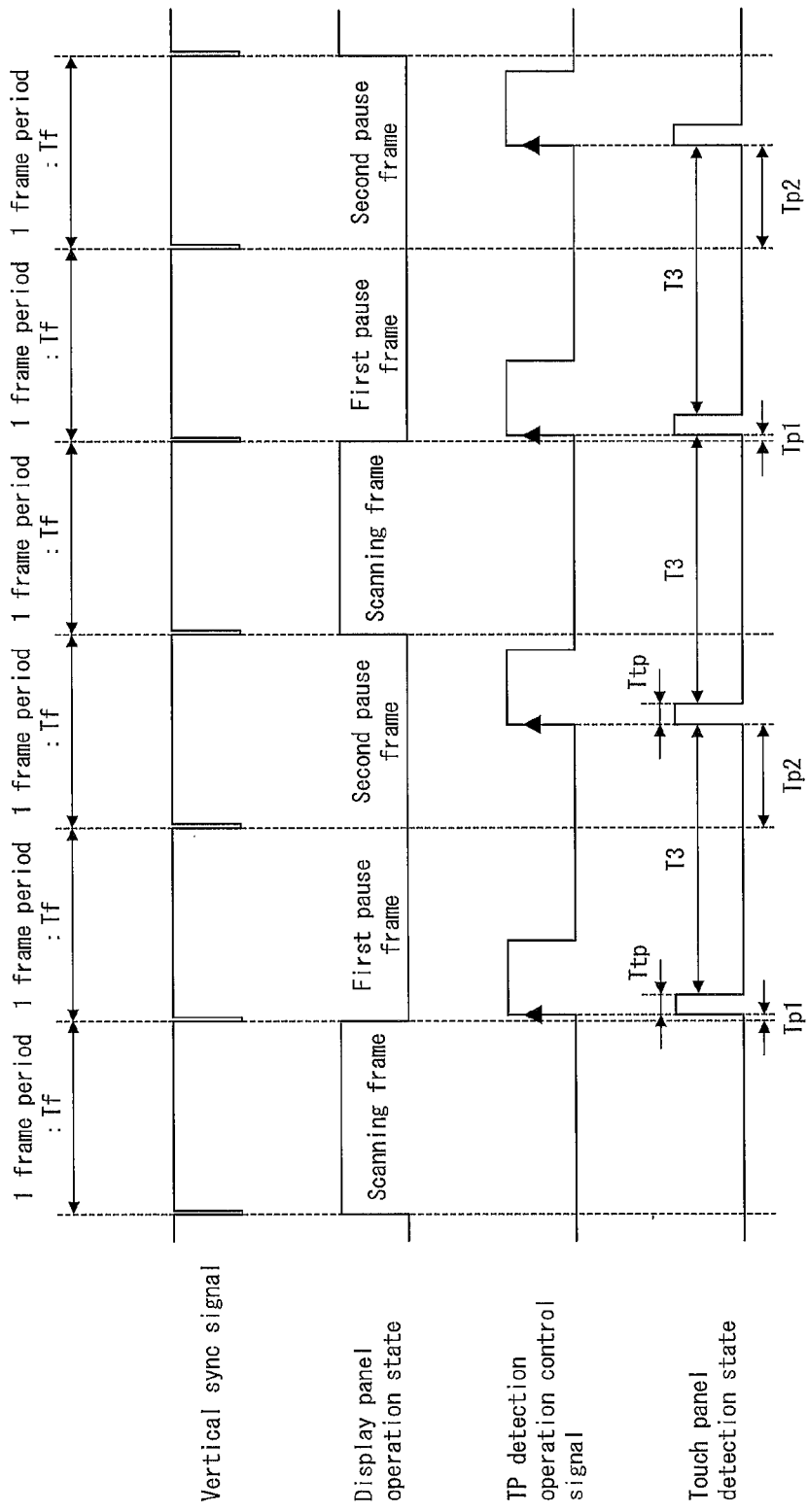
FIG. 3 is a timing chart showing a method for driving a display device in accordance with still another Example of the present invention.

FIG. 3 is a timing chart showing a method for driving the display device 2 of Example 3.

In Example 2, in a case where detection is made both in the first pause frame and the second pause frame, a detection start timing is fixed. That is, a time period from when a vertical sync signal rises (from when one frame period Tf starts) to when detection starts is kept fixed.

In contrast thereto, in the method for driving the display device 2 of Example 3, the aforementioned time period varies in length. The following description will discuss this regard with reference FIG. 3.

The display panel 2a of the display device 2 of Example 3 is arranged in the same manner as that of Example 2 such that a scanning frame is followed by two pause frames, i.e. a first pause frame (former half) and a second pause frame (latter half).

In FIG. 3, a time period Tp1 from when a vertical sync signal rises to when detection starts in the first pause frame is set to be shorter than a time period Tp2 from when a vertical sync signal rises to when detection starts in the second pause frame. That is, a detection start time (Tp1) in the first pause frame is earlier than a detection start time (Tp2) in the second pause frame.

By setting the time periods Tp1 and Tp2 appropriately, the detection section 8 can make regular detections. "Regular" here means that all the consecutive detections are carried out at equal intervals.

The following description will specifically discuss regular detections in the method for driving the display device 2 of Example 3. Initially, in the first pause frame in FIG. 3, a time period from when detection ends to when the first pause frame ends is represented by the equation (6)

$$Tf-Ttp-Tp1 \tag{6}$$

Therefore, T3, which is a time period obtained by adding a time period Tp2 to the time period obtained by the equation (6), is represented by the equation (7):

$$T3=(Tf-Ttp-Tp1)+Tp2=Tf-Ttp-Tp1+Tp2 \tag{7}$$

T3 represented by the equation (7) is a time period from when detection ends in the first pause frame to when detection starts in the second pause frame.

Next, in the second pause frame in FIG. 3, a time period from when detection ends to when the second pause frame ends is represented by the equation (8):

$$Tf-Ttp-Tp2 \tag{8}$$

Therefore, a time period T3 obtained by adding one frame period Tf in a scanning frame and the time period Tp1 to the time period represented by the equation (8) is represented by the equation (9):

$$T3=(Tf-Ttp-Tp2)+Tf+Tp1=2\times Tf-Ttp+Tp1-Tp2 \tag{9}$$

The time period represented by the equation (9) is a time period from when detection ends in the second pause frame to when detection starts in another first pause frame following the scanning frame.

In view of the above, the time periods Tp1 and Tp2 are set appropriately so that the time period represented by the equation (7) is equal to the time period represented by the equation (9), i.e. so as to meet the equation (10):

$$Tf-Ttp-Tp1+Tp2=2\times Tf-Ttp+Tp1-Tp2 \tag{10}$$

This allows the detection section 8 to make the detections regularly.

Example 4

Figure 4:
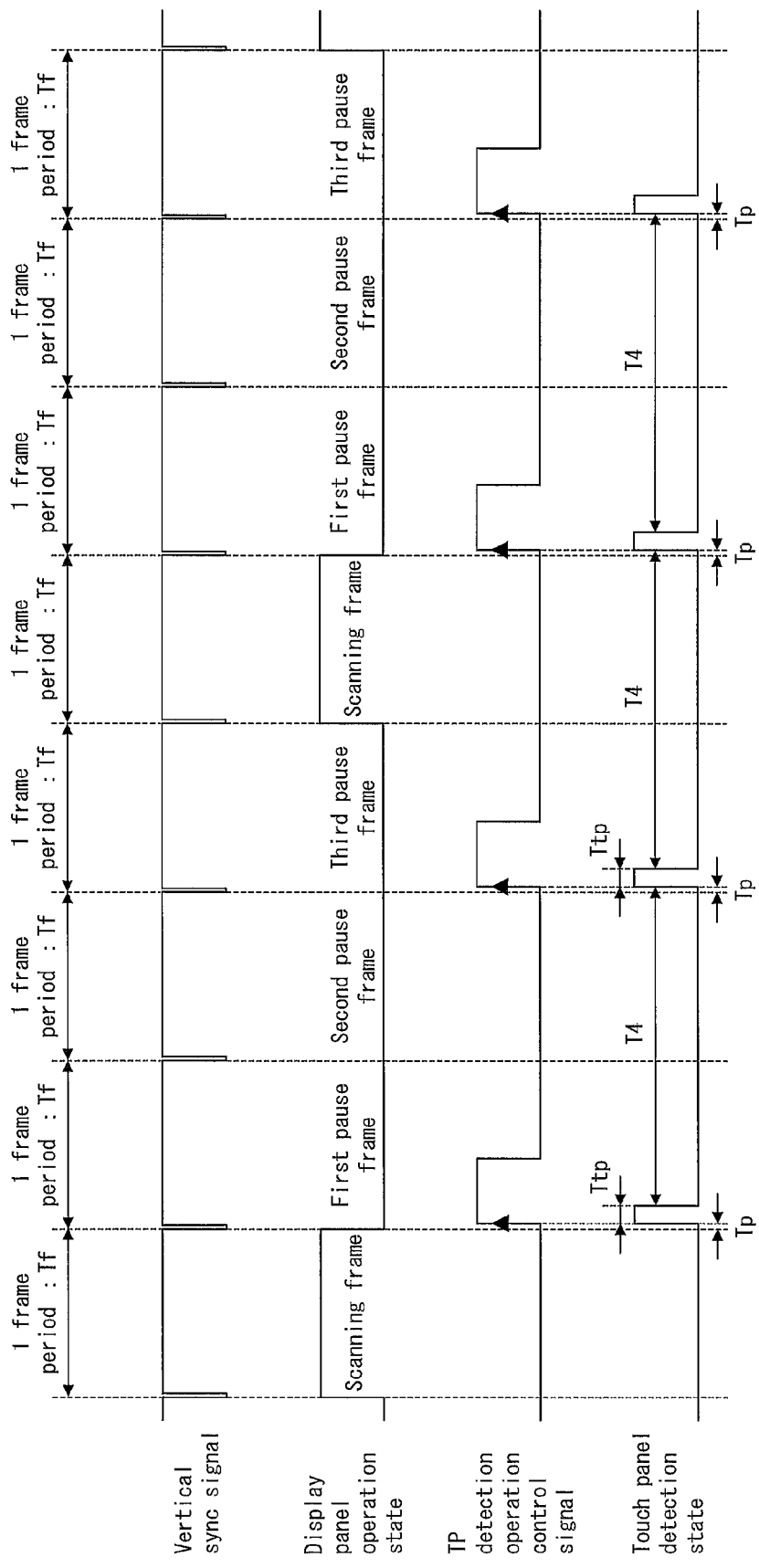
FIG. 4 is a timing chart showing a method for driving a display device in accordance with yet another Example of the present invention.

FIG. 4 is a timing chart showing a method for driving the display device 2 of Example 4.

In the method for driving the display device 2 of Example 4, a non-detection period consists of an odd number of pause frames (odd number of time periods), which is a period being an odd-multiple of (period equivalent to an odd-multiple of) one frame period Tf. Each of odd-numbered pause frames (odd-numbered period equivalent in length to a scanning period) of the odd number of pause frames has the same time to start detection and the same time to end detection. This allows the detection section 8 to make detection regularly, similarly with the Example 3.

The following description will specifically discuss regular detections in the method for driving the display device 2 of Example 4. Initially, in the first pause frame (first period) in FIG. 4, a time period from when detection ends to when the first pause frame ends is represented by the equation (11):

$$Tf-Ttp-Tp \tag{11}$$

Therefore, a time period T4 obtained by adding, to the time period represented by the equation (11), (i) one frame period Tf in the second pause frame and (ii) a time period Tp in the third pause frame, is represented by the equation (12):

$$T4=(Tf-Ttp-Tp)+Tf+Tp=2\times Tf-Ttp \tag{12}$$

The time period represented by the equation (12) is a time period from when detection ends in the first pause frame to when detection starts in the third pause frame.

Next, in the third pause frame (third period) in FIG. 3, a time period from when detection ends to when the third pause frame ends is represented by the equation (13):

$$Tf-Ttp-Tp \tag{13},$$

similarly with the case of the equation (11).

Therefore, a time period T4 obtained by adding, to the time period represented by the equation (13), (i) one frame period Tf in a scanning frame following the third pause frame and (ii) a time period Tp in a first pause frame following the scanning frame, is represented by the equation (14):

$$T4=(Tf-Ttp-Tp)+Tf+Tp=2\times Tf-Ttp \tag{14}$$

The time period represented by the equation (14) is a time period from when detection ends in the third pause frame to when detection starts in the next first pause frame (or in the fifth pause frame if there are five or more odd number of pause frames).

Since the time period represented by the equation (12) and the time period represented by the equation (14) are equal to each other, it is evident that when the display device 2 of Example 4 is driven, the detection section 8 makes regular detections.

The above description applies to a case where there are three pause frames. The above description also applies to a case where there are five or more odd number of pause frames, and two consecutive detections are made at an equal interval throughout all the detections. This allows the detection section 8 to make the detections regularly.

Example 5

Figure 5:
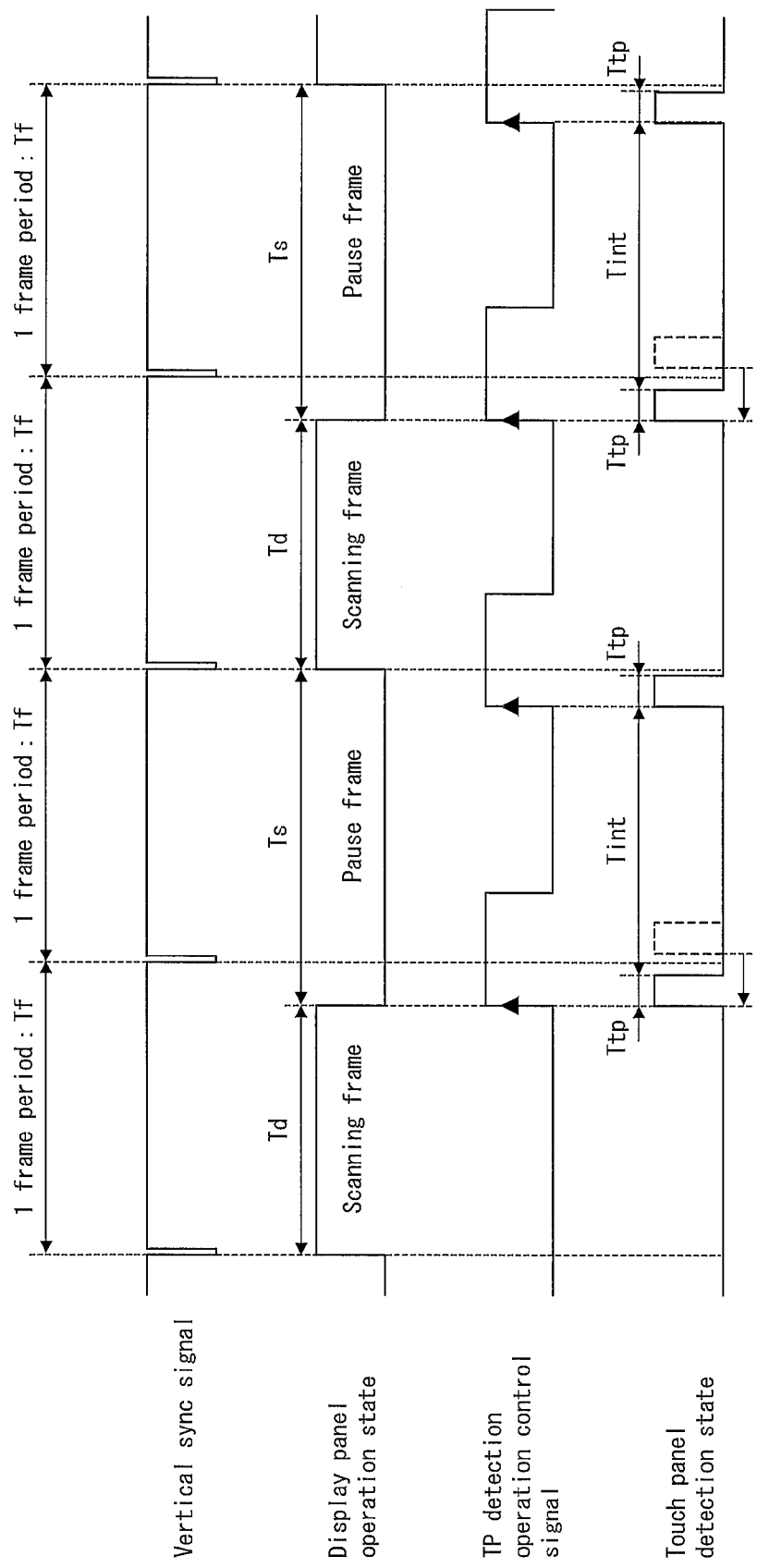
FIG. 5 is a timing chart showing a method for driving a display device in accordance with yet another Example of the present invention.

FIG. 5 is a timing chart showing a method for driving the display device 2 of Example 5.

In Examples 1 to 4, each of one scanning frame period and one pause frame period is one frame period Tf.

In this case, as shown in FIG. 1 for example, when detection is made plural times in a non-scanning period consisting of one pause frame, the time period T1 does not become equal to the time period T2, as described below.

That is, in driving the display device 2 shown in FIG. 1 (i.e. driving the display device 2 of Example 1), it is possible to achieve setting a detection frequency to be higher than a refresh frequency, which is a main object of the present invention.

However, as shown in FIG. 1, the time periods T1 and T2 are not equal to each other, so that detection is not made regularly. The time period T1 is a time period from when a certain touch panel detection period Ttp ends to when the next touch panel detection period Ttp starts. T2 is a time period from when a last touch panel detection period Ttp ends in a certain pause frame to when a first touch panel detection period Ttp starts in a next pause frame following the certain pause frame with a scanning frame therebetween.

In a method for driving the display device 2 of Example 5, a scanning frame (scanning period) is set to be shorter than one frame period Tf. The scanning period is a scanning frame (scanning period Td) in FIG. 5.

On the other hand, a non-scanning period is set to be longer than one frame period Tf by a length equal to such a shortened time of the scanning period. The non-scanning frame (non-scanning period) is a non-scanning frame (non-scanning period Ts) in FIG. 5.

In the non-scanning period Ts longer than one frame period Tf, first detection starts at a time when the scanning period Td ends, and second detection starts after a predetermined time (later-mentioned Tint) has passed from the end of the first detection.

Therefore, in the method for driving the display device 2 of Example 5, the scanning period Td, the non-scanning period Ts, and one frame period Tf meet the equation (15):

$$Td+Ts=2\times Tf \qquad (15).$$

In the non-scanning frames thus set, detection is made plural times. In order to regularly make two or more detections, it is necessary to meet the equation (16):

$$Ts \geq Ttp \times 2 + Tint \qquad (16)$$

wherein Ts represents a non-scanning period, Ttp represents a touch panel detection period (period required for the detection), and Tint represents a time period from when detection starting simultaneously with end of the scanning period Td ends to when next detection starts (interval between two consecutive detections in the non-scanning period, aforementioned predetermined time period).

As described above, in the method for driving the display device 2 of Example 5, the non-scanning period Ts is set to be longer than one frame period Tf and shorter than two frame periods (2×Tf), so that the detections can be made regularly. That is, regular detections can be achieved merely by setting one pause frame to be longer by a length equal to the shortened time of the scanning period (merely by setting the non-scanning period to be longer than one frame period Tf).

Consequently, an interval between two consecutive detections is shorter. More specifically, an interval between two consecutive detections is shorter than the interval obtained in the case where regular detections are realized by a plurality of pause frames (i.e. by a non-scanning period consisting of two frame periods (2×Tf) or more) (Examples 3 and 4). This allows realizing smooth detections.

As described above, in the display device 2 of Example 5, a non-scanning frame may be longer than a scanning frame.

The display device realizes regular detections by making two consecutive detections at an evenly spaced time interval. Alternatively, the display device realizes substantially regular detections by making two consecutive detections at a nearly evenly spaced time interval. That is, merely by setting the non-scanning frame to be longer than the scanning frame, regular or substantially regular detections can be realized. This allows realizing smooth detections.

Example 6

Figure 6:
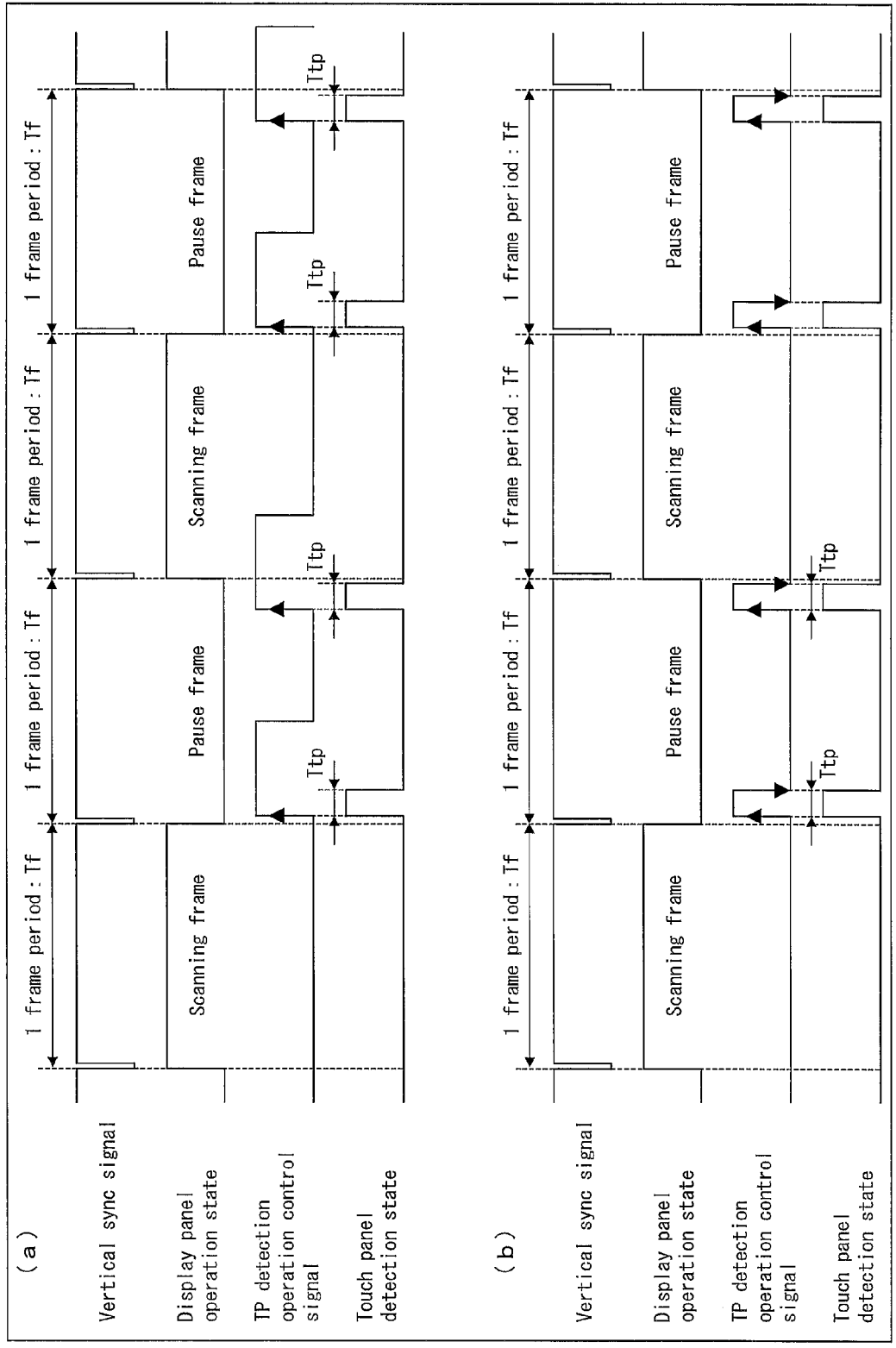
FIG. 6 is a timing chart showing a method for driving a display device in accordance with yet another Example of the present invention. (a) of FIG. 6 is a timing chart in a case where a start time of a detection period of a detection device is in sync with a time when a TP detection operation control signal rises. (b) of FIG. 6 is a timing chart in a case where an end time of a detection period of a detection device is in sync with a time when a TP detection operation control signal falls.
Figure 7:
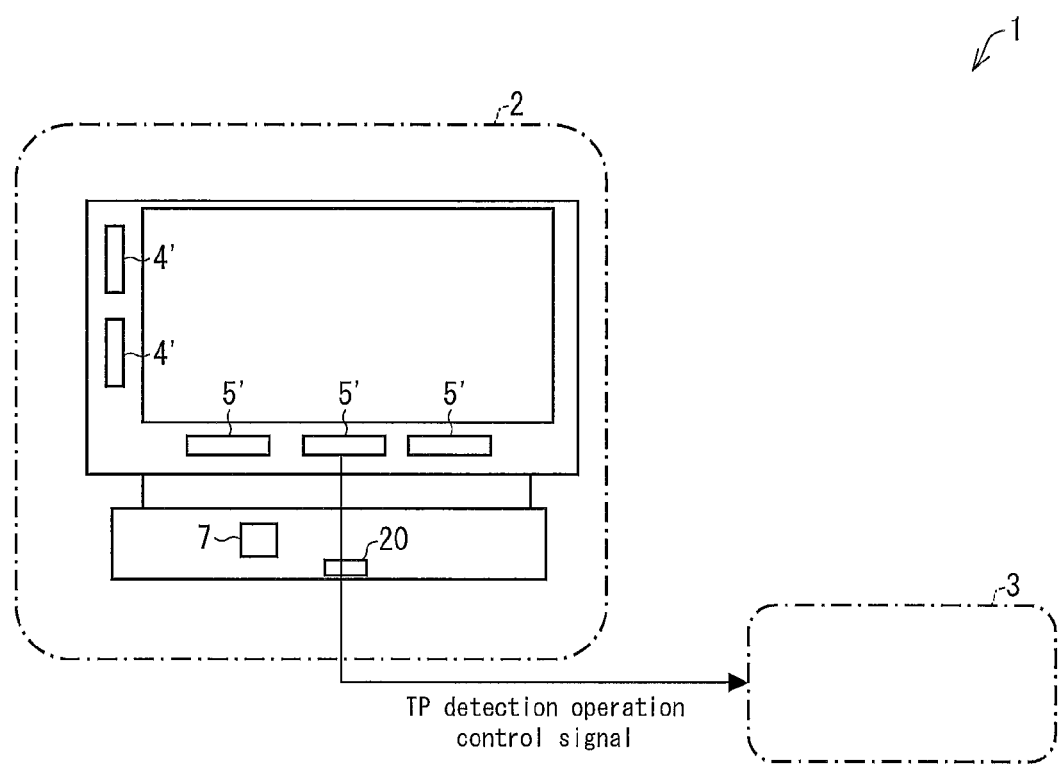
FIG. 7 is an explanatory view showing a configuration of a display device in accordance with yet another Example of the present invention.

FIG. 6 is a timing chart showing a method for driving a display device 2 of Example 6. FIG. 7 is an explanatory drawing showing a configuration of the display device 2 of Example 6.

In the display device 2 in FIG. 8, the timing controller 7 supplies, to the detection section control section 9 of the detection device 3, a TP detection operation control signal (arrow H) whose timing is identical to that of a pause driving control signal.

In the display device 2 in FIG. 1, upon receipt of a video signal (clock signal, sync signal, video data signal etc.), the timing controller 7 develops a delay equivalent to several clocks to several lines of scanning before outputting a sync control signal (source start pulse signal, source latch strobe signal, source clock signal, etc.) to the signal line driving circuit 5. Such a delay is caused because some time is spent for timing generation, image processing, and/or the like processing in the timing controller 7.

On the other hand, in the display device 2, as shown in FIG. 7, the scanning line driving circuit 4 may include gate driver sections 4' (two gate driver sections 4' in the example of FIG. 7) the number of which is set according to the number of the scanning signal lines G.

Furthermore, in the display device 2, as shown in FIG. 7, the signal line driving circuit 5 may include source driver sections 5' (signal line driving section, detection instructing circuit, three source driver sections 5' in the example of FIG. 7) the number of which is set according to the number of the data signal lines S.

These source driver sections 5' do not develop the aforementioned delay and therefore recognize the scanning period (and driving period) and the non-scanning period (and pause period) more exactly than the timing controller 7.

Accordingly, as shown in FIG. 7, one of the source driver sections 5' may supply a TP detection operation control signal to the detection section control section 9 of the detection device 3 via a connection terminal 20. This allows eliminating the influence of the delay caused when the timing controller 7 supplies a TP detection operation control signal to the detection section control section 9. This allows more correctly informing the detection device 3 of a length of non-scanning period of the display device 2. Consequently, it is possible to more precisely control detection operations to be performed by the detection section 8 of the detection device 3.

Here, the following refers back to Example 1 and FIGS. 1 to 5 and (a) of FIG. 6. A start time and an end time of the touch panel detection period Ttp may be in a period during which a detection operation control signal is active. That is, as shown in Example 1 and FIGS. 1 to 5 and (a) of FIG. 6, the start time of the touch panel detection period Ttp may be in sync with a time when a TP detection operation control signal rises.

Therefore, the touch panel detection period Ttp may start at a time when the TP detection operation control signal rises, and detection may be made during the predetermined touch panel detection period Ttp. The touch panel detection period Ttp may be predetermined by, for example, the detection device 3.

However, as shown in (b) of FIG. 6, not only the start time of the touch panel detection period Ttp may be in sync with the time when the TP detection operation control signal rises, but also the end time of the touch panel detection period Ttp may be in sync with the time when the TP detection operation control signal falls.

Consequently, the touch panel detection period Ttp is determined by the TP detection operation control signal, so that detection made by the detection section 8 can be controlled more precisely.

An output of the TP detection operation control signal from the source driver section 5' to the detection device 3 (shown in FIG. 7) may be combined with determination of the touch panel detection period Ttp by the TP detection operation control signal (shown in (b) of FIG. 6). This allows more precisely controlling detection operations made by the detection section 8.

(Electronic Equipment 1')

Figure 9:
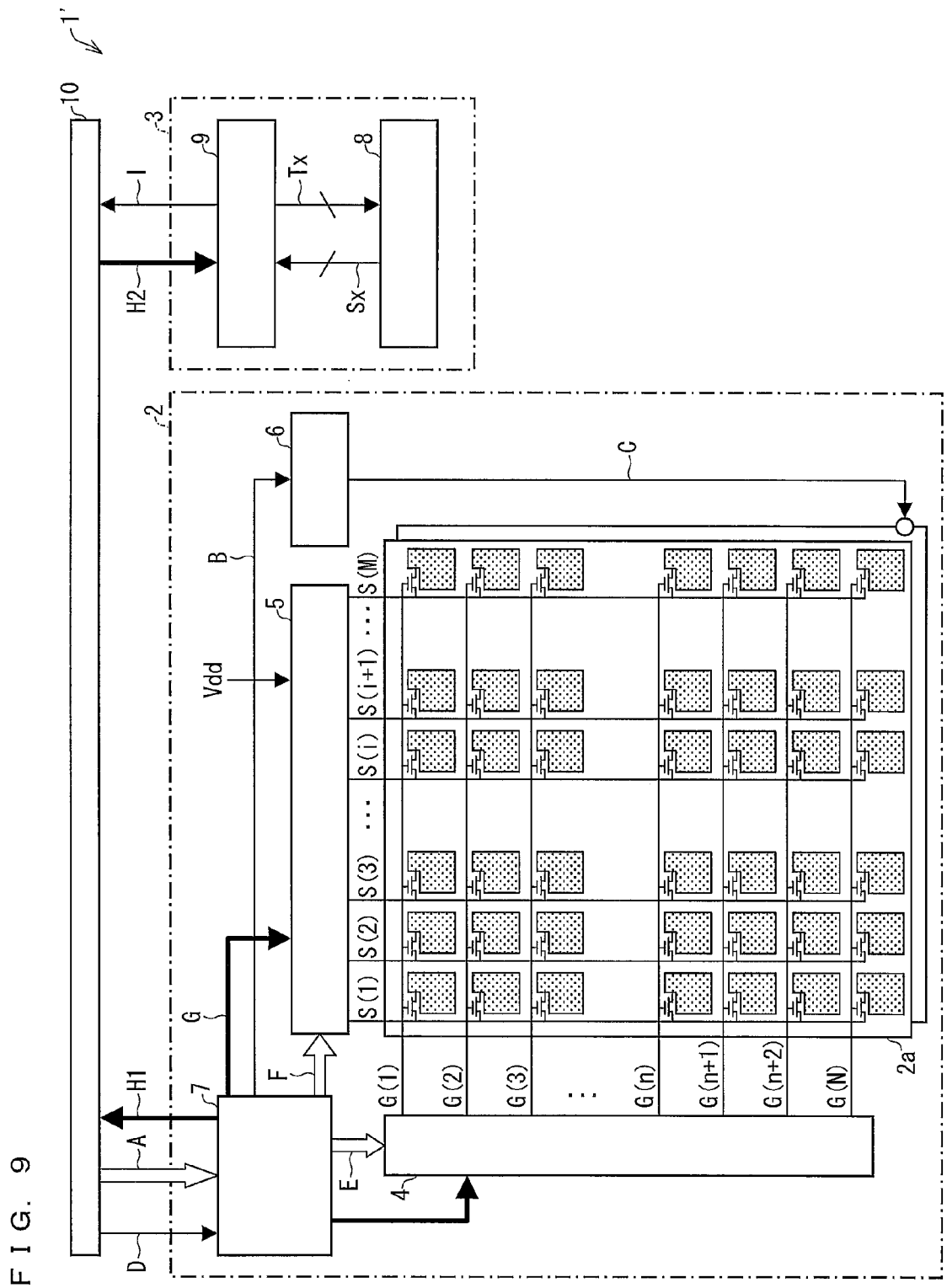
FIG. 9 is a block diagram showing in detail a configuration of another display device in accordance with the embodiment of the present invention.

FIG. 9 is a block diagram showing in detail a configuration of electronic equipment 1' in accordance with the present embodiment. A difference between the electronic equipment 1 and the electronic equipment 1' is a route of a TP detection operation control signal.

As described above, in the electronic equipment 1 in FIG. 8, a TP detection operation control signal is directly supplied from the timing controller 7 to the detection section control section 9 of the detection device 3.

In contrast, in the electronic equipment 1' in FIG. 9, a TP detection operation control signal is supplied to the detection section control section 9 of the detection device 3 via a system-side control section 10.

Specifically, the timing controller 7 supplies a first TP detection operation control signal (arrow H1) to the system-side control section 10. Next, the system-side control section 10 having received the first TP detection operation control signal supplies, to the detection section control section 9 of the detection device 3, a second TP detection operation control signal (arrow H2) whose timing is equal to that of the first TP detection operation control signal.

In a case where the TP detection operation control signal is supplied via the route illustrated in the electronic equipment 1' of FIG. 9, there occurs delay corresponding to a length of time required for the intervention of the system-side control section 10. Furthermore, in a case where the first TP detection operation control signal is subjected to signal processing such as inversion of a signal level, the signal processing causes delay, too.

These delays, i.e. the delay caused by the intervention of the system-side control section 10 and the delay caused by signal processing performed by the system-side control section 10 cause a delay time Tdelay between the first TP detection operation control signal and the second TP detection operation control signal.

Figure 10:
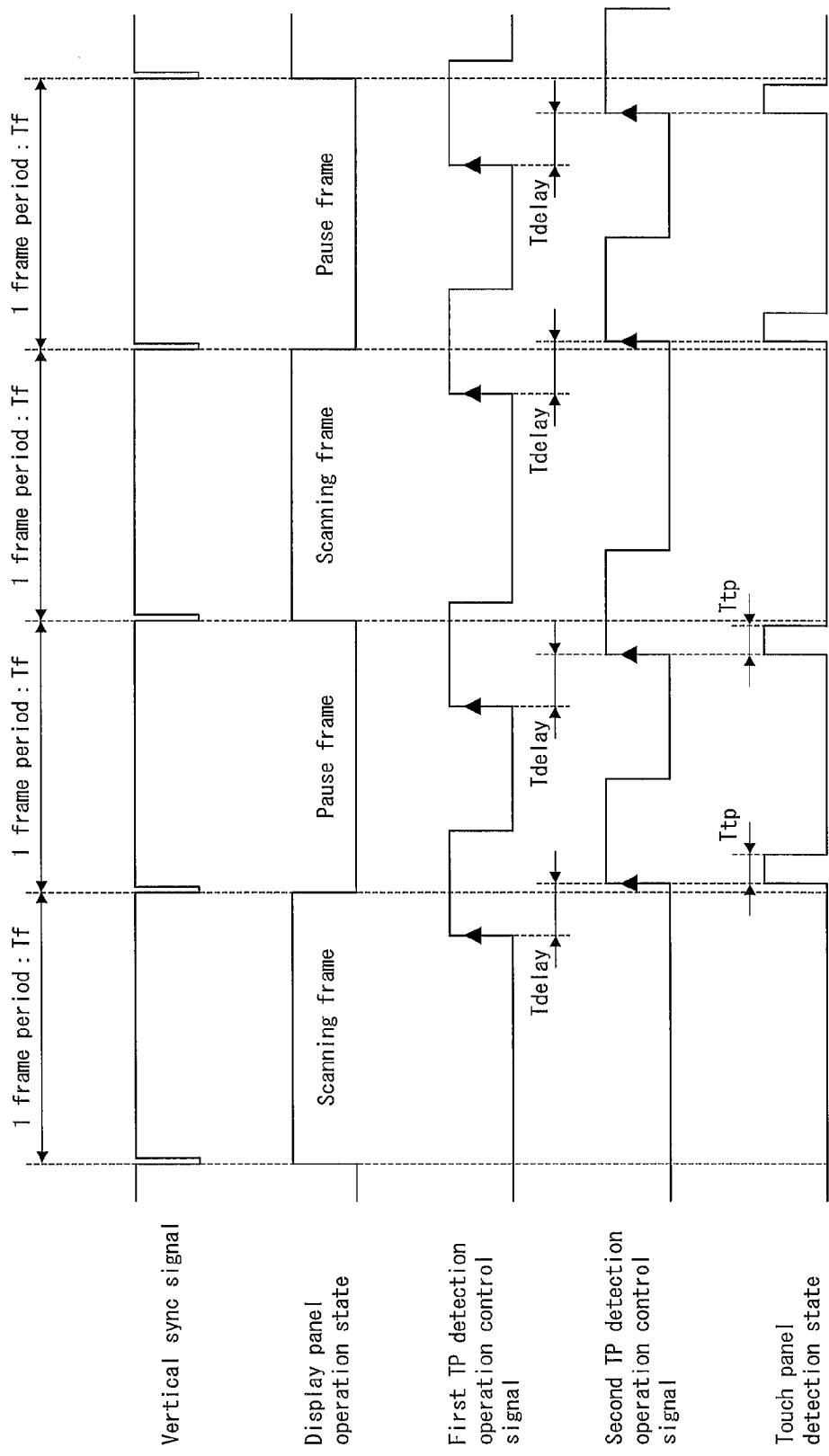
FIG. 10 is a timing chart showing a method for driving a display device in consideration of a delay time.

Accordingly, in the electronic equipment 1' in FIG. 9, the TP detection operation control signals are supplied in consideration of the delay time Tdelay, as shown in FIG. 10 for example. That is, the timing controller 7 supplies the first TP detection operation control signal (arrow H1) to the system-side control section 10 earlier by a time equivalent to the delay time Tdelay than the start time of the touch panel detection period Ttp.

The system-side control section 10 having received the first TP detection operation control signal subjects the first TP detection operation control signal to the signal processing if necessary, generates the second TP detection operation control signal, and then supplies the second TP detection operation control signal to the detection section control section 9 of the detection device 3.

Consequently, a time after the delay time Tdelay has passed from the time when the first TP detection operation control signal was supplied can be a time to start the touch panel detection period Ttp.

As described above, in the display device 2 of the electronic equipment 1' in accordance with the present embodiment, the plurality of pixels are provided in such a manner as to respectively correspond to intersections between a plurality of scanning signal lines G extending in one direction and a plurality of data signal lines S extending in the other direction.

Furthermore, the display device 2 of the electronic equipment 1' includes the scanning line driving circuit 4 for sequentially applying, on the scanning signal lines G, a gate clock signal (selection signal) for switching the scanning signal line G to a selected state.

Furthermore, the display device 2 of the electronic equipment 1' includes the signal line driving circuit 5 for supplying image data signals to the data signal lines S.

Furthermore, the display device 2 of the electronic equipment 1' includes the timing controller 7 (control circuit). In accordance with a vertical sync signal supplied from outside (i.e. from the system-side control section 10), the timing controller 7 supplies the selection signal to the scanning line driving circuit 4. Along with this, in accordance with a horizontal sync signal supplied from outside, the timing controller 7 supplies, to the signal line driving circuit 5, a source latch strobe signal (supply instruction signal) for instructing the signal line driving circuit 5 to supply the image data signal.

The timing controller 7 supplies, to the detection device 3, via the system-side control section 10 (centralized control section), a TP detection operation control signal (detection operation control signal) which is a signal for instructing the detection device 3 to make the detection plural times during at least one of the non-scanning periods. The system-side control section 10 supplies the vertical sync signal and the horizontal sync signal.

This allows the detection device 3 to make the detection plural times during at least one of the non-scanning periods.

Therefore, it is possible to provide the display device 2 which enables a detection device to make a detection operation with a frequency higher than a refresh frequency of the display device and with improved detection accuracy.

Also in the electronic equipment 1' in FIG. 9, the signal line driving circuit 5 may include source driver sections 5' the number of which is set according to the number of the data signal lines S. One of the source driver sections 5' may supply the TP detection operation control signal (second TP detection operation control signal) to the detection section control section 9 of the detection device 3 via a connection terminal and the system-side control section 10. This allows (i) eliminating the influence of delay caused when the timing controller 7 supplies the TP detection operation control signal to the detection section control section 9 and (ii) more precisely controlling detection operations to be performed by the detection section 8 of the detection device 3.

(Detection Device 3)

A period during which the detection device 3 in accordance with the present embodiment can make detection is not limited to a period during which the TP detection operation control signal (detection operation control signal) is valid. That is, the detection device 3 in accordance with the present embodiment may be arranged such that the detection device 3 makes detection operations themselves regardless of whether during the scanning period or the non-scanning period, and calculates a detection result by using only data obtained during a period when the TP detection operation control signal (detection operation control signal) is valid.

With this arrangement, data during a period when the TP detection operation control signal (detection operation control signal) is invalid (invalid period) is not employed. Consequently, it is possible to realize a detection accuracy that is equal to the detection accuracy obtained in a case where no detection is made during the invalid period.

(Display Panel 2a)

The display panel 2a in accordance with the present embodiment may be a liquid crystal panel including a liquid crystal layer. In this case, the display device 2 in accordance with the present embodiment is a liquid crystal display device.

A pixel of the display panel 2a in accordance with the present embodiment may include an organic EL (Electroluminescence) diode that is an element emitting light with luminance which varies in accordance with a flowing current. In this case, the display device 2 in accordance with the present embodiment is an organic EL display (organic electroluminescence display device).

Also in these display devices, the detection device 3 makes the detection plural times during at least one of the non-scanning periods. This allows providing a display device which enables a detection device to make a detection operation with a frequency higher than a refresh frequency of the display device and with improved detection accuracy.

(Pixels of Display Panel 2a)

The display panel 2a includes a plurality of pixels arranged in a matrix manner. Furthermore, the display panel 2a includes switching elements (TFT) which are included in pixels and connected with pixel electrodes, respectively.

The scanning line driving circuit 4 sequentially scans the scanning signal lines G, for example, from the top to the bottom of the screen. At that time, the scanning line driving circuit 4 outputs, to each of the scanning signal lines G, a rectangular wave for bringing a TFT into an on-state. This brings pixels of one row on the screen into a selected state.

Figure 15:
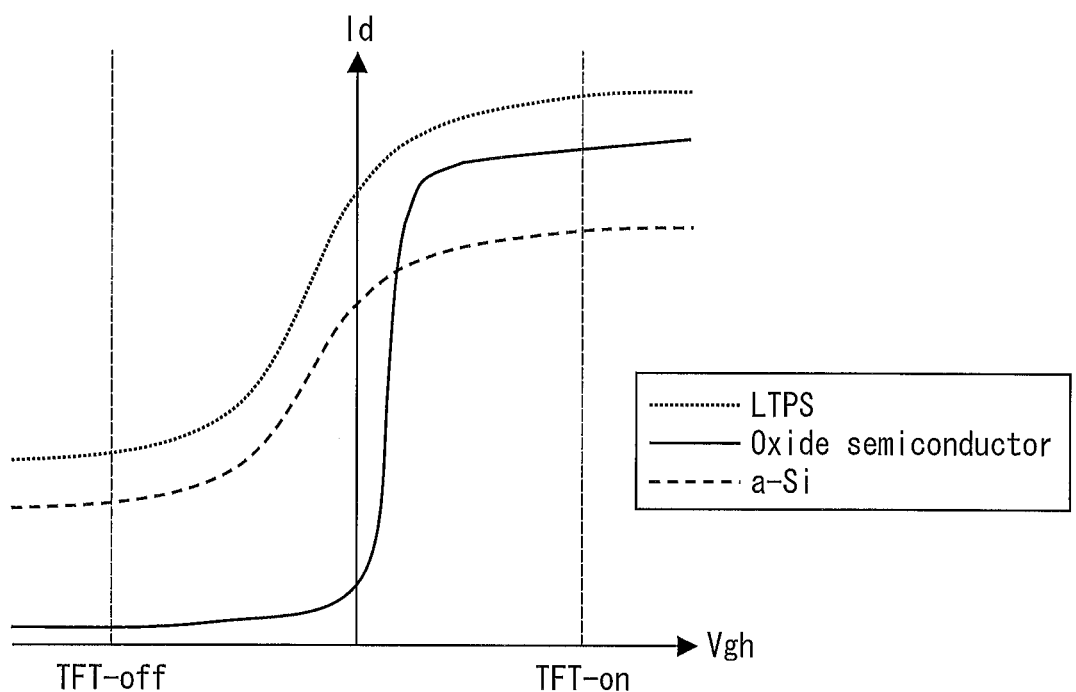
FIG. 15 is a view showing characteristics of several kinds of TFTs.

It is preferable to employ, as TFTs of the display panel 2a, TFTs each including a semiconductor layer made of so-called oxide semiconductor. An example of the oxide semiconductor is IGZO® (InGaZnOx). The reason is described below with reference to FIG. 15. FIG. 15 is a view showing characteristics of several kinds of TFTs. FIG. 15 shows characteristics of a TFT using oxide semiconductor, a TFT using a-Si (amorphous silicon), and a TFT using LTPS (Low Temperature Poly Silicon). In this drawing, a lateral axis (Vgh) indicates a voltage value of an on-voltage supplied to a gate of the TFT, and a vertical axis (Id) indicates an amount of a current flowing between a source and a drain of the TFT. In particular, the period labeled as "TFT-on" in the drawing indicates a period during which the TFT is in an on-state in response to a voltage value of an on-voltage, and the period labeled as "TFT-off" in the drawing indicates a period during which the TFT is in an off-state in response to a voltage value of the on-voltage.

As shown in FIG. 15, the TFT using oxide semiconductor passes a larger amount of current (i.e. electron mobility) in an on-state than the TFT using a-Si. Specifically, although not shown in the drawing, the TFT using a-Si passes an Id current of 1 uA when the TFT is in an on-state, whereas the TFT including oxide semiconductor passes an Id current of approximately 20 to 50 uA when the TFT is in an on-state. This shows that the TFT using oxide semiconductor has electron mobility of approximately 20 to 50 times higher than that of the TFT using a-Si and also has extremely excellent on-state characteristics.

In view of the above, employing the TFT using oxide semiconductor in pixels of the display device 2 of the present invention allows the pixels to have very excellent on-state characteristics of TFTs. This increases electron mobility in writing pixel data into the pixels, thereby further shortening a time required for the writing of the pixel data. The display device 2 can reduce a scanning period, thus enabling the detection device 3 to have a sufficient detection period correspondingly. This enables the detection device 3 to have much higher detection accuracy.

Application Example

Since the electronic equipment of the present invention includes: any of the aforementioned display devices 2; and the detection device 3, the electronic equipment of the present invention enables the detection device to make a detection operation with a frequency higher than a refresh frequency of the display device and with improved detection accuracy.

Summary

The display device may be arranged such that the detection device determines a timing for each of the detection in such a manner as to minimize a difference between (i) an interval between two consecutive detections, of the detections, made in a corresponding one of the non-scanning periods and (ii) an interval between two consecutive detections, of the detections, made in a period including corresponding one of the scanning periods.

This allows the interval between two consecutive detections to be increased as much as possible and allows the interval to be made as close to constant as possible, thereby realizing nearly regular detections.

In the display device, the non-scanning period may be longer than the scanning period.

The display device realizes regular detections by making two consecutive detections at an evenly spaced time interval. Alternatively, the display device realizes substantially regular detections by making two consecutive detections at a nearly evenly spaced time interval. That is, merely by setting the non-scanning period to be longer than the scanning period, regular or substantially regular detections can be realized. This allows realizing smooth detections.

The display device may be arranged such that the display device holds $Ts \geq Ttp \times 2 + Tint$ wherein Ts represents the non-scanning period, Ttp represents a period required for the detection, and Tint represents the interval between the two consecutive detections in the corresponding one of the non-scanning periods.

In the display device, regular detections can be realized by employing the non-scanning period which is longer than the scanning period and shorter than a period being a double of the scanning period. That is, merely by setting the non-scanning period to be longer than the scanning period, regular detections can be realized.

Consequently, an interval between two consecutive detections is shorter than the interval obtained in a case where regular detections are realized by employing the non-scanning period which is equal to or longer than a double of the scanning period. Therefore, it is possible to realize smooth detections.

The display device may be arranged such that the plurality of pixels are provided in such a manner as to respectively correspond to intersections between a plurality of scanning signal lines extending in one direction and a plurality of data signal lines extending in other direction, and the display device further comprises: a scanning line driving circuit that sequentially applies, on the plurality of scanning signal lines, a selection signal which is a signal for switching the scanning signal line to a selected state; a signal line driving circuit that supplies an image data signal to each of the data signal lines; and a control circuit that outputs the selection signal to the scanning line driving circuit in accordance with a vertical sync signal supplied from outside and outputs, to the signal line driving circuit, a supply instruction signal for instructing the signal line driving circuit to supply the image data signal, in accordance with a horizontal sync signal supplied from outside, the signal line driving circuit includes signal line driving sections, the number of which is set according to the number of the data signal lines, and one of the signal line driving sections includes the detection instructing circuit.

Also in this display device, the detection instructing circuit included in the signal line driving section supplies, in at least one of the non-scanning periods, the detection operation control signal for instructing the detection device to make detections plural times. This allows providing a display device which enables a detection device to make a detection operation with a frequency higher than a refresh frequency of the display device and with improved detection accuracy.

Furthermore, the detection instructing circuit included in the signal line driving section supplies the detection operation control signal from the signal line driving section to the detection device. This allows (i) eliminating the influence of delay caused when the control circuit supplies the detection operation control signal from the control circuit to the detection device and (ii) more precisely controlling detection to be performed by the detection device.

The display device may be arranged such that the non-scanning period is equivalent to an integer multiple of the scanning period.

Consequently, it is possible to make detection plural times in the non-scanning period which is equivalent to an integer-multiple of the scanning period. This allows the detection frequency indicative of how many times the detection is made to be higher than the refresh frequency indicative of how many times the plurality of pixels are updated.

Therefore, it is unnecessary to make detection plural times in each of the periods constituting the non-scanning period and each being equivalent in length to the scanning period.

Therefore, it is possible to reduce power consumption in the detection device.

The display device may be arranged such that the non-scanning period is equivalent to a double of the scanning-period, and each of the detections which is made in a former half of a corresponding one of the non-scanning periods is started earlier than each of the detections which is made in a latter half of the corresponding one of the non-scanning periods.

With the arrangement, a time period from when detection ends in the former half to when detection starts in the latter half (in a corresponding one of the non-detection periods, a time period from when first detection ends to when second detection starts) can be equal to a time period when detection ends in the latter half to when detection starts in the former half of the next non-scanning period (time period from when second detection ends in a corresponding one of the non-detection periods to when first detection starts in another non-detection period subsequent to the corresponding one of the non-detection periods).

Consequently, it is possible to make the detections regularly.

The display device of the present invention may be arranged such that the non-scanning period is a period equivalent to an odd multiple of the scanning period, and in the non-scanning period, each of the detections is started at a same time in each of odd-numbered periods which are each equivalent in length to the scanning period, and each of the detections is ended at a same time in each of the odd-numbered periods.

With the arrangement, a time period from when detection ends in a first period of a corresponding one of the non-scanning periods to when detection starts in a third period of the corresponding one of the non-scanning periods is equal to a time period from when the detection ends in the third period of the corresponding one of the non-scanning periods to when the detection starts in a first period of another non-scanning period subsequent to the corresponding one of the non-scanning periods after going through the scanning period. Subsequently, similarly, two consecutive detections are made at an equal interval throughout all the detections.

Consequently, it is possible to make the detections regularly.

The display device of the present invention may be arranged such that the plurality of pixels are provided in such a manner as to respectively correspond to intersections between a plurality of scanning signal lines extending in one direction and a plurality of data signal lines extending in other direction, the display device further comprises: a scanning line driving circuit that sequentially applies, on the plurality of scanning signal lines, a selection signal which is a signal for switching the scanning signal line to a selected state; a signal line driving circuit that supplies an image data signal to each of the data signal lines; and a control circuit that outputs the selection signal to the scanning line driving circuit in accordance with a vertical sync signal supplied from outside and outputs, to the signal line driving circuit, a supply instruction signal for instructing the signal line driving circuit to supply the image data signal, in accordance with a horizontal sync signal supplied from outside, and the control circuit includes the detection instructing circuit.

Also in this display device, the detection instructing circuit supplies, in at least one of the non-scanning periods, the detection operation control signal for instructing the detection device to make detections plural times. This allows providing a display device which enables a detection device to make a detection operation with a frequency higher than a refresh frequency of the display device and with improved detection accuracy.

The display device may be arranged such that the plurality of pixels are provided in such a manner as to respectively correspond to intersections between a plurality of scanning signal lines extending in one direction and a plurality of data signal lines extending in other direction, the display device further comprises: a scanning line driving circuit that sequentially applies, on the plurality of scanning signal lines, a selection signal which is a signal for switching the scanning signal line in a selected state; a signal line driving circuit that supplies an image data signal to each of the data signal lines; a control circuit that outputs the selection signal to the scanning line driving circuit in accordance with a vertical sync signal supplied from outside and outputs, to the signal line driving circuit, a supply instruction signal for instructing the signal line driving circuit to supply the image data signal, in accordance with a horizontal sync signal supplied from outside; and a centralized control section that supplies the vertical sync signal and the horizontal sync signal, and the control circuit outputs the detection operation control signal to the detection device via the centralized control section.

Consequently, the detection device can make the detection plural times in at least one of the non-scanning periods.

Also in this display device, the detection instructing circuit supplies, in at least one of the non-scanning periods, the detection operation control signal for instructing the detection device to make detections plural times. This allows providing a display device which enables a detection device to make a detection operation with a frequency higher than a refresh frequency of the display device and with improved detection accuracy.

The display device of the present invention may be arranged such that the scanning line driving circuit, the signal line driving circuit, and the control circuit invert a polarity of a voltage to be applied to each of the pixels during the scanning period. This allows improving detection accuracy and reducing power consumption of the detection device in a case where dot-inversion driving which requires high current consumption during the scanning period is made.

The display device of the present invention may be a liquid crystal display device.

The display device of the present invention may be an organic electroluminescence display device.

Also in these display devices, the detection instructing circuit supplies, in at least one of the non-scanning periods, the detection operation control signal for instructing the detection device to make detections plural times. This allows providing a display device which enables a detection device to make a detection operation with a frequency higher than a refresh frequency of the display device and with improved detection accuracy.

The display device of the present invention may be arranged such that the detection device is a touch panel provided on a screen of the display device. Use of the touch panel as the detection device allows detecting the position where a user's finger or the like touches or approaches.

An example of the touch panel is a projected capacitive touch panel. In the case of the projected capacitive touch panel, a part where detection is made is made up of (i) a transparent substrate made of, for example, glass or plastic and (ii) transparent electrode patterns, made of for example ITO (Indium Tin Oxide), arranged in a matrix manner and formed on the transparent substrate. When a user's finger or the like touches or approaches a certain position of the part where detection is made, capacitances at a plurality of transparent electrode patterns on and around that position change. The control section for the part where detection is made detects a change in current or voltage of the transparent electrode patterns, thereby detecting the position where the user's finger or the like touches or approaches.

The display device may be arranged such that the detection device generates velocity information on a velocity of movement of the detection target on the screen, and in at least one of the non-scanning periods, the display device outputs the detection operation control signal in the number corresponding to the velocity information.

With the arrangement, for example, in a case where a detection target such as a user's finger increases its moving velocity on a touch panel, it is possible to increase the number of times of detection to be made by a detection device. This enables the detection device to accurately detect the position of the detection target even if the detection target increases its moving velocity.

The display device may be arranged such that the detection device is an RF reception device for (i) detecting a radio wave coming from outside and (ii) receiving a signal included in the radio wave.

Although the detection device may be, for example, a touch panel, the present invention is applicable to any detection device. Examples of the detection device, other than a touch panel, include an RF (Radio Frequency) reception circuit for receiving (detecting) a radio wave coming from an external device. In receiving a radio wave, the RF reception circuit is influenced by EMI (ElectroMagnetic Interference) emitted from the display device. Accordingly, designing the RF reception circuit to receive (detect) a radio wave while the display device is in a pause mode enables accuracy in the received signal to be higher.

The display device of the present invention may be arranged such that the pixel of the display device includes a TFT, and the TFT includes a semiconductor layer made of an oxide semiconductor. The oxide semiconductor may be IGZO.

The TFT used herein is a TFT including a semiconductor layer made of IGZO. This allows increasing the amount of electrons traveling in writing pixel data into individual pixels, thereby further shortening a time for writing the pixel data. This enables the display device to shorten the scanning period, so that the detection device can have a sufficient detection period correspondingly. This enables the detection device to have higher detection accuracy.

Electronic equipment of the present invention includes any of the aforementioned display devices and the detection device. This enables the detection device to make a detection operation with a frequency higher than a refresh frequency of the display device and with an improved accuracy in detection.

The present invention is not limited to the description of the embodiments above, but may be altered by a skilled person within the scope of the claims. An embodiment based on a proper combination of technical means disclosed in different embodiments is encompassed in the technical scope of the present invention.

INDUSTRIAL APPLICABILITY

The display device of the present invention is applicable to a display device capable of directly or indirectly controlling a detection device having a touch panel or an RF reception device. In particular, the display device of the present invention is suitably applicable to a display device requiring a high detection frequency, such as a display device which allows user's handwriting on a touch panel.

1, 1' Electronic equipment
2 Display device
2a Display panel
3 Detection device
4 Scanning line driving circuit
4' Gate driver section
5 Signal line driving circuit
5' Source driver section (signal line driving section, detection instructing circuit)
6 Common electrode driving circuit
7 Timing controller (control circuit, detection instructing circuit)
8 Detection section
9 Detection-section control section
10 System-side control section (centralized control section)
G Scanning signal line
Rx Sense line
S Data signal line
Tf 1 frame period
Ttp Touch panel detection period
Tx Driving line

The invention claimed is:

1. A display device comprising:
a screen including a plurality of pixels;
a detection device configured to perform a detection operation for the screen, the detection operation includes detecting a position of an input made by an object touching or approaching the screen; and
a detection instruction circuit configured to output a detection operation control signal to the detection device, wherein
the screen repeatedly alternates between (a) each of scanning periods during which the plurality of pixels are scanned in such a manner that the plurality of pixels are sequentially brought into a selected state and (b) each of non-scanning periods during which the plurality of pixels are not scanned at all;
a length of the each of scanning periods is same as one cycle of a vertical sync signal, and a length of the each of non-scanning periods is same as integer multiple of the one cycle of the vertical sync signal; and
the detection operation by the detection device is performed plural times during the each of non-scanning periods.

2. The display device of claim 1, wherein
the length of the each of non-scanning periods is same as one cycle of the vertical sync signal.

3. The display device of claim 1, wherein
a number of times of the detection operation is the same for each of the non-scanning periods.

4. The display device of claim 3, wherein
the detection operation control signal includes a plurality of pulses during each of the non-scanning periods, and
a pulse width for all of the plurality of pulses are the same.

* * * * *